US012266241B2

(12) United States Patent
Thomas et al.

(10) Patent No.: US 12,266,241 B2
(45) **Date of Patent: *Apr. 1, 2025**

(54) SYSTEMS AND METHODS FOR MULTIPLAYER GAMING

(71) Applicant: Aristocrat Technologies, Inc., Las Vegas, NV (US)

(72) Inventors: Alfred Thomas, Ventura, CA (US); Larry Pacey, Calabasas, CA (US); Joseph Masinter, II, Las Vegas, NV (US); John Daley, Las Vegas, NV (US); Michele Rousseau, Las Vegas, NV (US); Daniel Marks, Decatur, GA (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 697 days.

This patent is subject to a terminal disclaimer.

(21) Appl. No.: 17/338,375

(22) Filed: Jun. 3, 2021

(65) Prior Publication Data

US 2021/0295658 A1 Sep. 23, 2021

Related U.S. Application Data

(63) Continuation of application No. 16/588,257, filed on Sep. 30, 2019, now Pat. No. 11,158,170.

(Continued)

(51) Int. Cl.

| | |
|---|---|
| ***G07F 17/00*** | (2006.01) |
| ***G07F 17/32*** | (2006.01) |
| *G07F 17/34* | (2006.01) |

(52) U.S. Cl.

CPC ...... *G07F 17/3272* (2013.01); *G07F 17/3223* (2013.01); *G07F 17/3227* (2013.01);

(Continued)

(58) Field of Classification Search

None

See application file for complete search history.

(56) References Cited

U.S. PATENT DOCUMENTS

| | | | |
|---|---|---|---|
| 6,634,942 | B2 | 10/2003 | Walker |
| 6,656,042 | B2 | 12/2003 | Reiss |

(Continued)

OTHER PUBLICATIONS

Office Action dated Aug. 14, 2020 for U.S. Appl. No. 16/588,257 (pp. 1-12).

(Continued)

*Primary Examiner* — Paul A D'Agostino

(74) *Attorney, Agent, or Firm* — Aristocrat Technologies, Inc.

(57) ABSTRACT

A communal gaming system provides a communal game to players of electronic gaming devices. The system includes a plurality of EGMs, each EGM includes a trigger condition identifying when the player is awarded participation in the communal game. The system also includes a communal game display configured to display a communal game play area. The system (a) begins a game cycle for a game instance of the communal game; (b) receives, from a first device and in response to detecting the trigger condition, a communal participation trigger message; (c) awards a participation entry in the game cycle to the player; (d) transmits, to the first device, a participation award message indicating successfully entry of the player in the game cycle; (e) conducts the communal game, thereby generating an award outcome of the communal game for the player; and (f) awards the player based on the generated award outcome.

18 Claims, 18 Drawing Sheets

Related U.S. Application Data

(60) Provisional application No. 62/895,321, filed on Sep. 3, 2019.

(52) U.S. Cl.
CPC ...... *G07F 17/3258* (2013.01); *G07F 17/3267* (2013.01); *G07F 17/34* (2013.01)

(56) References Cited

U.S. PATENT DOCUMENTS 6,811,484 B2 11/2004 Katz
7,857,696 B2 12/2010 Tarantino
8,075,390 B2 12/2011 Walker
8,157,647 B2 4/2012 House
8,475,265 B2 7/2013 Lafky
8,535,134 B2 9/2013 Katz
8,662,980 B2 3/2014 Lafky
8,795,063 B2 8/2014 Caputo
8,905,831 B2 12/2014 Lafky
9,466,180 B2 10/2016 Englman
9,466,183 B2 10/2016 Afky
9,489,801 B2 11/2016 Crivelli
9,508,225 B2 11/2016 Katz
9,615,347 B1 * 4/2017 Kerr .................... G07F 17/3218
9,824,537 B1 * 11/2017 Pascal ..................... G07F 17/34
9,905,080 B2 2/2018 Lafky
9,928,692 B2 3/2018 Hoffman
9,947,178 B2 4/2018 Katz
9,972,171 B2 5/2018 Marston
9,978,213 B2 5/2018 Graham
10,002,496 B2 6/2018 Humphrey
10,032,337 B2 7/2018 Washington
10,068,417 B2 9/2018 Toohey
10,074,241 B2 9/2018 Berman
10,089,828 B2 10/2018 Nelson
10,096,199 B2 10/2018 Caputo
10,096,208 B2 10/2018 Caputo
10,102,717 B2 10/2018 Saunders
10,121,316 B2 11/2018 De Waal
10,121,319 B2 11/2018 Radisich
10,121,325 B2 11/2018 Hoffman
10,134,232 B2 11/2018 Preisach
10,147,262 B2 12/2018 Hoffman
10,169,950 B2 1/2019 Little
10,176,674 B2 1/2019 Katz
10,198,915 B2 2/2019 Thompson
10,269,221 B2 4/2019 Katz
10,275,994 B2 4/2019 Katz
11,158,170 B2 * 10/2021 Thomas .............. G07F 17/3272
2003/0119576 A1 * 6/2003 McClintic ............... G07F 17/32 463/20
2005/0130732 A1 6/2005 Rothschild
2006/0046823 A1 * 3/2006 Kaminkow ........... G07F 17/326 463/16
2008/0045341 A1 2/2008 Englman
2008/0051171 A1 2/2008 Lutnick
2008/0058049 A1 3/2008 Lutnick
2008/0113775 A1 * 5/2008 Williams ............ G07F 17/3202 463/33
2008/0248849 A1 10/2008 Lutnick
2009/0017906 A1 1/2009 Jackson
2009/0124366 A1 5/2009 Aoki
2009/0291736 A1 11/2009 Walker
2009/0325715 A1 12/2009 Kelly
2010/0029363 A1 2/2010 Hoffman
2010/0087256 A1 4/2010 Frattinger
2010/0248812 A1 9/2010 Pacey
2011/0130192 A1 * 6/2011 Englman ............. G07F 17/3223 463/20
2011/0130197 A1 6/2011 Bytnar
2011/0159940 A1 * 6/2011 Acres ...................... G07F 17/32 463/20
2011/0230251 A1 9/2011 Nicely
2011/0287828 A1 * 11/2011 Anderson ................. A63F 9/24 463/25
2012/0028703 A1 2/2012 Anderson
2012/0077587 A1 3/2012 Apirian
2012/0077588 A1 3/2012 Apirian
2012/0202587 A1 * 8/2012 Allen .................. G07F 17/3225 463/25
2012/0215617 A1 * 8/2012 Shah ...................... G06Q 30/02 705/14.1
2012/0258790 A1 10/2012 Gomez
2013/0079088 A1 3/2013 Lafky
2013/0079089 A1 3/2013 Lafky
2013/0079108 A1 3/2013 Lafky
2013/0079109 A1 3/2013 Lafky
2013/0084965 A1 4/2013 Gura
2013/0217477 A1 8/2013 Wright
2013/0225282 A1 * 8/2013 Williams ............ G07F 17/3218 463/29
2013/0260868 A1 10/2013 Caputo
2013/0281189 A1 * 10/2013 Gagner ............... G07F 17/3225 463/25
2013/0303273 A1 * 11/2013 Lipka .................. G07F 17/3225 463/26
2013/0337878 A1 12/2013 Shepherd
2014/0080590 A1 * 3/2014 Link ................... G07F 17/3255 463/25
2014/0087801 A1 3/2014 Nicely
2014/0162761 A1 6/2014 Crivelli
2014/0370969 A1 * 12/2014 LeMay ............... G07F 17/3211 463/25
2015/0011302 A1 1/2015 Mayeroff
2015/0039444 A1 * 2/2015 Hardin ................. G06Q 20/384 705/14.69
2015/0057069 A1 2/2015 Lafky
2015/0148119 A1 * 5/2015 Arnone ............... G07F 17/3288 463/25
2015/0148122 A1 * 5/2015 Arnone ............... G07F 17/3225 463/29
2015/0294531 A1 10/2015 Arnone
2016/0005255 A1 1/2016 Nelson
2016/0012465 A1 * 1/2016 Sharp ................... G06Q 20/321 705/14.17
2016/0239904 A1 * 8/2016 Washington ........... G06Q 50/34
2017/0024971 A1 1/2017 Afky
2017/0076545 A1 3/2017 Crivelli
2017/0084118 A1 * 3/2017 Robinson ............ G07F 17/3241
2017/0092063 A1 * 3/2017 Donelan ............. G07F 17/3206
2017/0186270 A1 * 6/2017 Acres .................. G07F 17/3272
2017/0256141 A1 * 9/2017 Simons ............... G07F 17/3262
2017/0364999 A1 * 12/2017 Herriger ............ G06Q 30/0207
2018/0182210 A1 6/2018 Lafky
2018/0189839 A1 * 7/2018 Lutnick ............... G07F 17/3227
2018/0190080 A1 * 7/2018 Washington ........ G07F 17/3211
2021/0295658 A1 * 9/2021 Thomas .............. G07F 17/3267

OTHER PUBLICATIONS

Office Action dated Aug. 21, 2020 for U.S. Appl. No. 16/588,319 (pp. 1-14).
Notice of Allowance dated Dec. 24, 2020 for U.S. Appl. No. 16/588,319 (pp. 1-6).
Notice of Allowance dated Feb. 24, 2021 for U.S. Appl. No. 16/588,257 (pp. 1-7).

* cited by examiner

SYSTEMS AND METHODS FOR MULTIPLAYER GAMING

CROSS-REFERENCE TO RELATED APPLICATIONS

This application is a continuation of U.S. patent application Ser. No. 16/588,257, filed Sep. 30, 2019, entitled SYSTEMS AND METHODS FOR MULTIPLAYER GAMING, which claims the benefit of priority to U.S. Provisional Patent Application No. 62/895,321, filed 3 Sep. 2019, entitled "SYSTEMS AND METHODS FOR MULTIPLAYER GAMING," the entire contents and disclosures of which are hereby incorporated herein by reference in their entirety.

This application is also related to U.S. patent application Ser. No. 16/588,319, filed Sep. 30, 2019, entitled SYSTEMS AND METHODS FOR MULTIPLAYER GAMING, the entire contents and disclosures of which are hereby incorporated by reference in their entirety.

TECHNICAL FIELD

The field of disclosure relates generally to electronic gaming, and more particularly to electronic gaming systems and methods for providing multiplayer gaming with electronic gaming machines.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of a round, or play, of a primary game, sometimes referred to as a base game. In many games, a player may qualify for secondary games or bonus rounds by attaining a certain winning combination or other trigger conditions in the primary game. Secondary games provide an opportunity to win additional game rounds, credits, awards, jackpots, progressives, etc. Awards from any winning outcomes are typically added back to the credit balance and can be provided to the player via a printed "ticket" upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for ready identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

In addition to traditional stand-up EGMs, many modern wagering venues also include bar top EGMs offering games such as video poker, video black jack, video keno, video slots, and many more. Such bar top games are often provided in lounges or other social settings, providing a different experience than stand-up gaming on casino floors. Further, mobile gambling now allows players to play games of chance or bet on sporting events via their smartphone, tablet computer, or other personal mobile device.

Advances in electronic gaming have presented new experiences for players and led to usage improvements for gaming machines. However, many of the existing experiences are solitary experiences, leading to machine underuse. What is lacking is a multiplayer gaming experience that can be presented in conjunction with a variety of favorite games.

BRIEF DESCRIPTION

In one aspect, a communal gaming system for providing a communal game to players of electronic gaming devices is provided. The communal gaming system includes a plurality of electronic gaming devices allowing the players to wager on outcomes of primary games. Each electronic gaming device of the plurality of electronic gaming devices includes a definition of a trigger condition identifying when the player is awarded participation in the communal game. The communal gaming system also includes a communal game display configured to display a play area of the communal game. The communal gaming system further includes at least one processor including instructions. When executed, the instructions cause the at least one processor to begin a game cycle for a game instance of the communal game. The instructions also cause the at least one processor to receive, from a first device of the plurality of electronic gaming devices and in response to detecting an occurrence of the trigger condition by a player at a first electronic gaming device, a communal participation trigger message indicating the occurrence of the trigger condition. The instructions further cause the at least one processor to award a participation entry in the game cycle to the player based on receiving the communal participation trigger message. The instructions also cause the at least one processor to transmit, to the first device, a participation award message indicating successfully entry of the player in the game cycle. The instructions further cause the at least one processor to conduct the communal game, thereby generating an award outcome of the communal game for the player. The instructions also cause the at least one processor to awarding the player based on the generated award outcome.

In another aspect, an electronic gaming machine providing a primary game and participation in a communal game to a player is provided. The electronic gaming device includes a display device, a player input device, a credit input mechanism configured to receive a credit wager, and a storage medium having instructions stored thereon including a communal game client configured to communicate with a communal gaming server. The electronic gaming device also includes a game controller configured to execute instructions stored in a tangible, non-transitory, computer-readable storage medium. When executed by the game controller, the instructions cause the game controller to identify at least one trigger condition definition that includes a trigger condition associated with the primary game. The instructions also cause the game controller to detect the occurrence of the at least one trigger condition during primary game play. The instructions further cause the game controller to transmit a communal participation trigger message to the communal gaming server in response to detecting the occurrence of the at least one trigger condition. The instructions also cause the game controller to receive a participation award message indicating successful entry of the player in a game cycle of the communal game. The instructions further cause the game controller to display, to the player, an award outcome of the player from the game instance of the communal game.

In yet another aspect, a computer-implemented method for providing a communal game to players of electronic gaming devices is provided. The method includes beginning a game cycle for a game instance of the communal game. The method also includes receiving, from a first device of a plurality of electronic gaming devices and in response to detecting an occurrence of a trigger condition by a player at a first electronic gaming device, a communal participation trigger message indicating the occurrence of the trigger condition. The method further includes awarding a participation entry in the game cycle to the player based on receiving the communal participation trigger message. The method also includes transmitting, to the first device, a participation award message indicating successfully entry of the player in the game cycle. The method further includes conducting the communal game, thereby generating an award outcome of the communal game for the player. The method also includes awarding the player based on the generated award outcome.

BRIEF DESCRIPTION OF THE DRAWINGS

An example embodiment of the subject matter disclosed will now be described with reference to the accompanying drawings.

DETAILED DESCRIPTION

Figure 1:
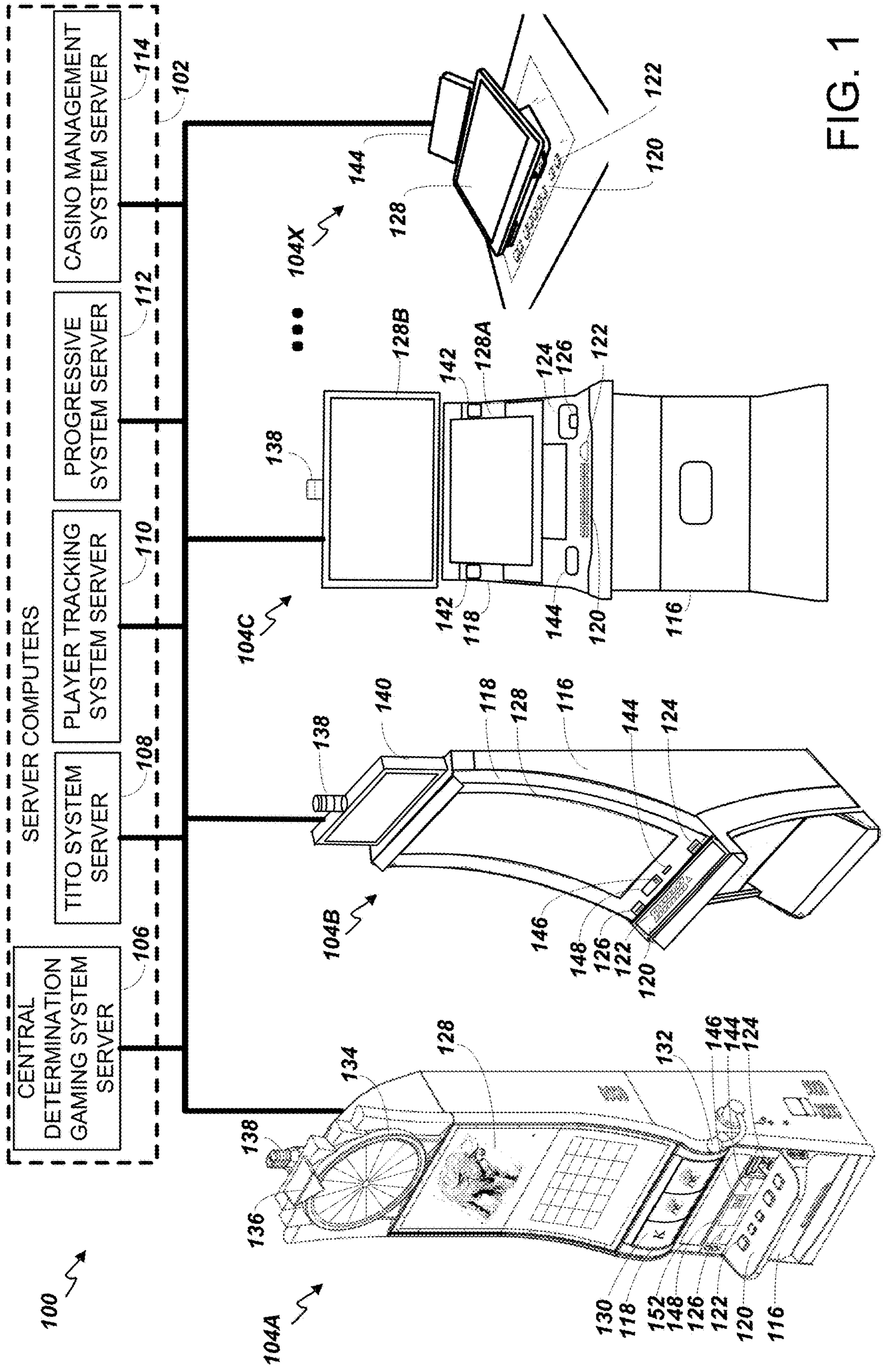
FIG. 1 is a diagram of exemplary EGMs networked with various gaming-related servers.

A communal multiplayer electronic game (or just "communal game") that is compatible with a variety of primary game types and currency types and accessible across multiple locations is described herein. In an example embodiment, the communal game is a bonus game provided as a secondary gaming experience to players (e.g., through bar top or stand-up EGMs, mobile devices) while they are playing a primary game on those gaming devices. Participation in the communal game is awarded to players through trigger conditions that occur within the various primary games during primary game play. For example, some players may be playing video poker and the communal game may be configured to award participation in the communal game whenever the player achieves a full house or better during a hand of video poker. Other players may be playing video black jack and the communal game may be configured to award participation in the communal game whenever the player achieves a suited black jack (e.g., Ace of hearts and King of hearts). Various types of primary games may participate in the communal game, with each type of primary game having their own trigger condition(s) for participation. As such, the players can participate in the communal game while playing a familiar game (their respective primary games), thereby both increasing machine use of the primary gaming device and augmenting a familiar experience with additional gaming experiences.

The communal game may be displayed on a display device ("communal display") within view of some or all of the participating primary gaming devices. In one example, a venue (e.g., a lounge, bar, tavern, restaurant, casino) is configured with numerous bar top EGMs providing a variety of electronic games, such as video poker, video slots, video black jack, video keno, and so forth. The communal display may be a large, flat-screen display device mounted within the venue and in view of some or all of the nearby primary gaming devices. The communal display shows aspects of the shared gaming experience to both the primary players and to other nearby patrons, thereby creating shared excitement in the communal game. As players are awarded participation in the communal game, their participation is illustrated on the communal display, allowing both the awarded player to witness their participation as well as other players and bystanders to view the current status of the communal game.

In one example embodiment, the communal game is a Ca$h Wall™ game that provides a shared play area for the players. The play area defines a matrix of M×N rows and columns, where each intersecting row and column defines a spot on the play area. Each time a player triggers communal participation (e.g., via a particular trigger condition within their own primary game), that player is awarded one spot on the play area. The communal game may automatically assign a vacant spot to the awarded player or may allow the awarded player to select a vacant spot (e.g., via a graphical interface of the play area presented on their own primary gaming device). As players are awarded spots on the play area, the communal game displays a base bet value for each awarded spot. The base bet value represents a base amount, vested in the associated player, which will be multiplied by a particular award multiplier during game play of the communal game. In some embodiments, avatars of each awarded player are displayed within their awarded spot(s), along with the base amount and, in some cases, a background, border color, and/or an icon indicating in which type of primary game the spot was awarded. The avatar and color may be used by the player to track which spots they have been awarded in the current game cycle of communal play.

Once all of the spots in the play area are occupied, the communal play for the current game cycle is conducted. In this example, the communal game defines a set of multiplier values (e.g., 4×, 5×, 10×, 15×, 20×) that are awarded during communal play. The communal game conducts a round of play for each multiplier value, beginning the first round of play with the lowest multiplier (e.g., 4×). During each round, the communal game selects one or more winning rows and columns of the play area, highlighting both the current award multiplier and the active spots in those winning rows and columns to alert the players that all spots in that row or column have won the current multiplier. The base value of each winning spot is multiplied by the award multiplier and the winning player receives the total as an award amount for that spot. The updated total award amount or multiplier value awarded may be displayed on each of the winning spots to illustrate how much each spot won. Once each winning spot in the current round of play has been awarded, those spots become inactive for the remainder of the game cycle, and may be subdued or removed from the play area to illustrate their ineligibility for participation in subsequent rounds. The communal game increases to the next higher multiplier and conducts the next round of the game, selecting another row and column, awarding and deactivating those winning spots until all multipliers have been awarded. In some embodiments, any unawarded spots remaining after the last round may receive a flat dollar value award (e.g., $100) or may spin a wheel to determine the top/largest award multiplier to be applied.

A multiplayer game architecture and associated systems and methods are described herein. In an example embodiment, the multiplayer game architecture includes one or more Multiplayer game servers that are configured to support various multiplayer games such as the Ca$h Wall communal game described herein, as well as progressives and tournaments. A single multiplayer game server may be configured to support participating EGMs at a particular venue or property, allowing operators to instantiate multiplayer games and assign particular EGMs to particular game instances (e.g., for regular supplemental play, for particular events, for tournaments). The multiplayer game architecture provides tiered administrative functionality, allowing operator configurability and delegation to venue-level control (e.g., for bartenders or managers to control aspects of game play at a lounge or particular setting). The multiplayer game architecture may be provided and managed by a third-party service provider to ease administration. The multiplayer game architecture may support mobile device participation in the multiplayer games. Further, the multiplayer game architecture may facilitate multi-site participation in multiplayer games, progressives, and tournaments. The multiplayer game architecture may additionally integrate with other gaming services (e.g., player tracking and loyalty systems, ticketing systems, or other casino management systems).

The term "primary game," as used herein, refers to a digital game (e.g., wagering game, social game) that is the primary focus of a player during a playing session. The player continues to play the primary game through the course of their playing session, in some cases providing real money or soft currency wagers during the course of play of the primary game. Primary games include a base game and may additionally include an ability to activate one or more feature games or bonus games during primary game play. Such feature games are solo games played on the gaming device of the player, typically with a number of "free spins," and while game play of the base game is suspended. The present disclosure describes various communal games in which the player may be awarded participation during primary game play. The term "communal game," as used herein, refers to a digital game in which multiple players may be awarded participation through their primary game play, and which is supplemental to the primary games of the participating players. In example embodiments described herein, communal game participation may be awarded through various types of primary games, at potentially multiple locations, and may support various types of currencies for entry or for award (e.g., primary game wagers or communal game awards in real currencies, loyalty points, or other soft currencies).

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a web site maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a mobile device (e.g., a player's smartphone), a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
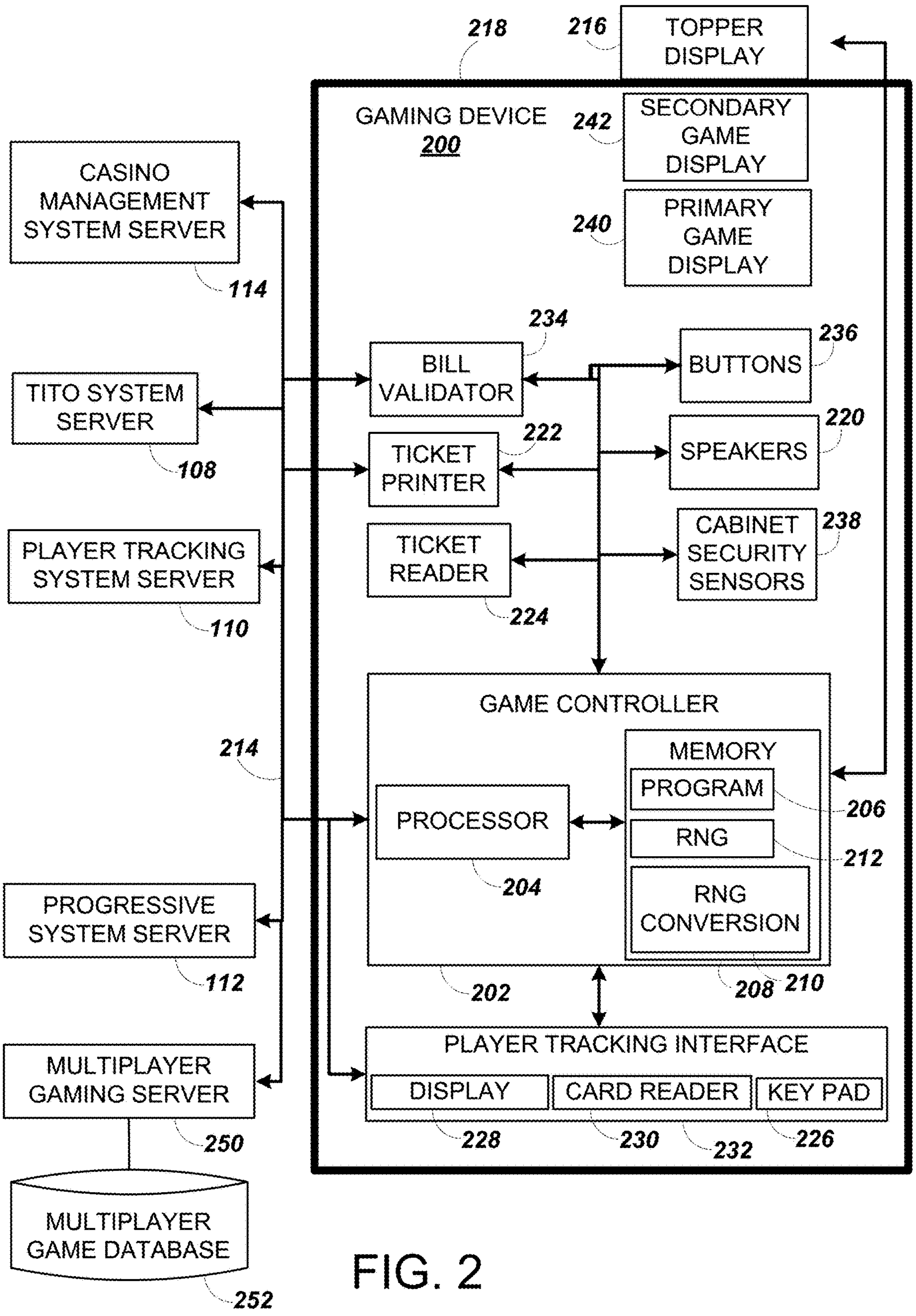
FIG. 2 is a block diagram of an exemplary EGM.

Many or all the above described components can be controlled by circuitry (e.g., a gaming controller) housed inside the main cabinet 116 of the gaming device 104A, the details of which are shown in FIG. 2.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Yet another example gaming device 104X is a tabletop or bar top gaming device that may provide many different types of games, including, for example, mechanical slot games, video slot games, video poker, video black jack, video pachinko, keno, bingo, and lottery. Each gaming device 104 may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. As shown in FIG. 2, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2 illustrates that game controller 202 includes a single processor 204, game controller 202 is not limited to this representation and instead can include multiple processors 204 (e.g., two or more processors).

FIG. 2 illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EE-PROM), or other like memory device. Even though FIG. 2 illustrates that game controller 202 includes a single memory 208, game controller 208 could include multiple memories 208 for storing program instructions and/or data.

Memory 208 can store one or more game programs 206 that provide program instructions and/or data for carrying out various embodiments (e.g., game mechanics) described herein. Stated another way, game program 206 represents an executable program stored in any portion or component of memory 208. In one or more embodiments, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be setup to generate one or more game rounds based on instructions and/or data that gaming device 200 exchange with one or more remote gaming devices, such as a central determination gaming system server 106 (not shown in FIG. 2 but shown in FIG. 1). With regard to primary games played on the gaming device 200, the term "game round" refers to a play or a round of a game that gaming device 200 presents (e.g., via a user interface (UI)) to a player (e.g., the game play occurring after submission of a single wager). The game round is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

In some jurisdictions, one regulatory requirement for games running on gaming device 200 may include complying with a certain level of randomness. Typically, gaming jurisdictions mandate that gaming devices 200 satisfy a minimum level of randomness without specifying how a gaming device 200 should achieve this level of randomness. To comply, FIG. 2 illustrates that gaming device 200 includes a random number generator (RNG) 212 that utilizes hardware and/or software to generate RNG outcomes that lack any pattern. The RNG operations are often specialized and non-generic in order to comply with regulatory and gaming requirements. For example, in a reel game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more embodiments, RNG 212 could be one of a set of RNGs operating on gaming device 200. Game developers could vary the degree of true randomness for each RNG (e.g., pseudorandom) and utilize specific RNGs depending on game requirements.

Another regulatory requirement for running games on gaming device 200 may include ensuring a certain level of return to player (RTP). Similar to the randomness requirement discussed above, numerous gaming jurisdictions also mandate that gaming device 200 provides a minimum level of RTP (e.g., RTP of at least 75%). FIG. 2 illustrates that gaming device 200 includes an RNG conversion engine 210 that translates the RNG outcome from RNG 212 to a game outcome presented to a player. To meet a designated RTP, a game developer can setup the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2 also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gamine machine. The credit balance is used by the player to place wagers on rounds of the game and to receive credit awards based on the outcome of winning rounds. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game round, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Although FIGS. 1 and 2 illustrates specific embodiments of a gaming device (e.g., gaming devices 104A-104X and 200), the disclosure is not limited to those embodiments shown in FIGS. 1 and 2. For example, not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards. Additionally, or alternatively, gaming devices 104A-104X and 200 can include credit transceivers that wirelessly communicate (e.g., Bluetooth or other near-field communication technology) with one or more mobile devices to perform credit transactions. As an example, bill validator 234 could contain or be coupled to the credit transceiver that output credits from and/or load credits onto the gaming device 104A by communicating with a player's smartphone (e.g., a digital wallet interface). Gaming devices 104A-104X and 200 may also include other processors that are not separately shown. Using FIG. 2 as an example, gaming device 200 could include display controllers (not shown in FIG. 2) configured to receive video input signals or instructions to display images on game displays 240 and 242. Alternatively, such display controllers may be integrated into the game controller 202. The use and discussion of FIGS. 1 and 2 are examples to facilitate ease of description and explanation.

In the example embodiment, the gaming device 200 participates in a communal game provided by a multiplayer gaming server 250. The multiplayer gaming server 250 communicates with the gaming device 200 over network

214. During operation, the multiplayer gaming server 250 begins accepting participation trigger messages from gaming devices 200 for a current game cycle of a communal game instance. In some embodiments, the multiplayer gaming server 250 may open and manage a registration window for the current game cycle of the communal game, during which players may be awarded participation in the communal game. A player (not shown in FIG. 2) plays a primary game on the gaming device 200 and participation in the communal game is activated (e.g., awarded) based on trigger conditions occurring during primary game play. Trigger conditions are configured based on the type of game being hosted by the gaming device 200. When the player achieves a trigger condition (e.g., four-of-a-kind in video poker, a "00" bet win in video Roulette, or such), the trigger condition causes the multiplayer gaming server 250 to award the player with participation in a current game cycle of the communal game. The multiplayer gaming server 250 maintains a communal game database 252 to track participation data for game cycles of this and other communal game instances (e.g., which players have vested entries in the current game cycle, base values for the entries, player identification information, machine identification information, and so forth). The multiplayer gaming server 250 periodically closes the registration window or otherwise ceases to accept registration trigger messages for the current game cycle (e.g., when a pre-determined number of spots have been awarded) and commences play of the current game cycle. During game play of the current cycle, the vested players (e.g., those players registered with one or more spots on the current Ca$h Wall) are each awarded based on the communal game result, as described in greater detail below, and the multiplayer gaming server 250 credits the award result to each player (e.g., with credit back to their gaming device 200). Once all credits have been awarded, the multiplayer gaming server 250 begins the next game cycle of the communal game.

In some embodiments, the gaming device 200 may be configured with a communal game button (not separately shown). The communal game button may be used to change a wager level that makes the player eligible for (e.g., participating in) the communal game. For example, the communal game button may toggle participation in the communal game. When communal game participation is toggled on, an incremental bet amount is automatically added to a base wager amount (e.g., the wager amount selected by the player during primary game play) and trigger conditions are active for participation in the communal game (e.g., allowing the player to potentially win a spot on the Ca$h Wall). When communal game participation is toggled off, the primary game is unchanged, but the trigger conditions are inactive. As such, if trigger conditions occur while communal game participation is toggled off, communal game participation is not awarded (e.g., no spot on the Ca$h Wall is won). The communal game button may be provided as a virtual or physical button on the gaming device 200.

In some embodiments, the multiplayer gaming server 250 may transmit trigger condition definitions to gaming devices 200 participating in the communal game. The gaming devices 200 may include a communal game client (not shown in FIG. 2) that receives and manages the trigger conditions (e.g., activating or deactivating trigger conditions, detecting when trigger conditions occur in the primary game). In some embodiments, trigger conditions are configurable (e.g., by operators). As such, trigger conditions may be centrally controlled, configured, changed, and deployed from the multiplayer gaming server 250.

Figure 3:
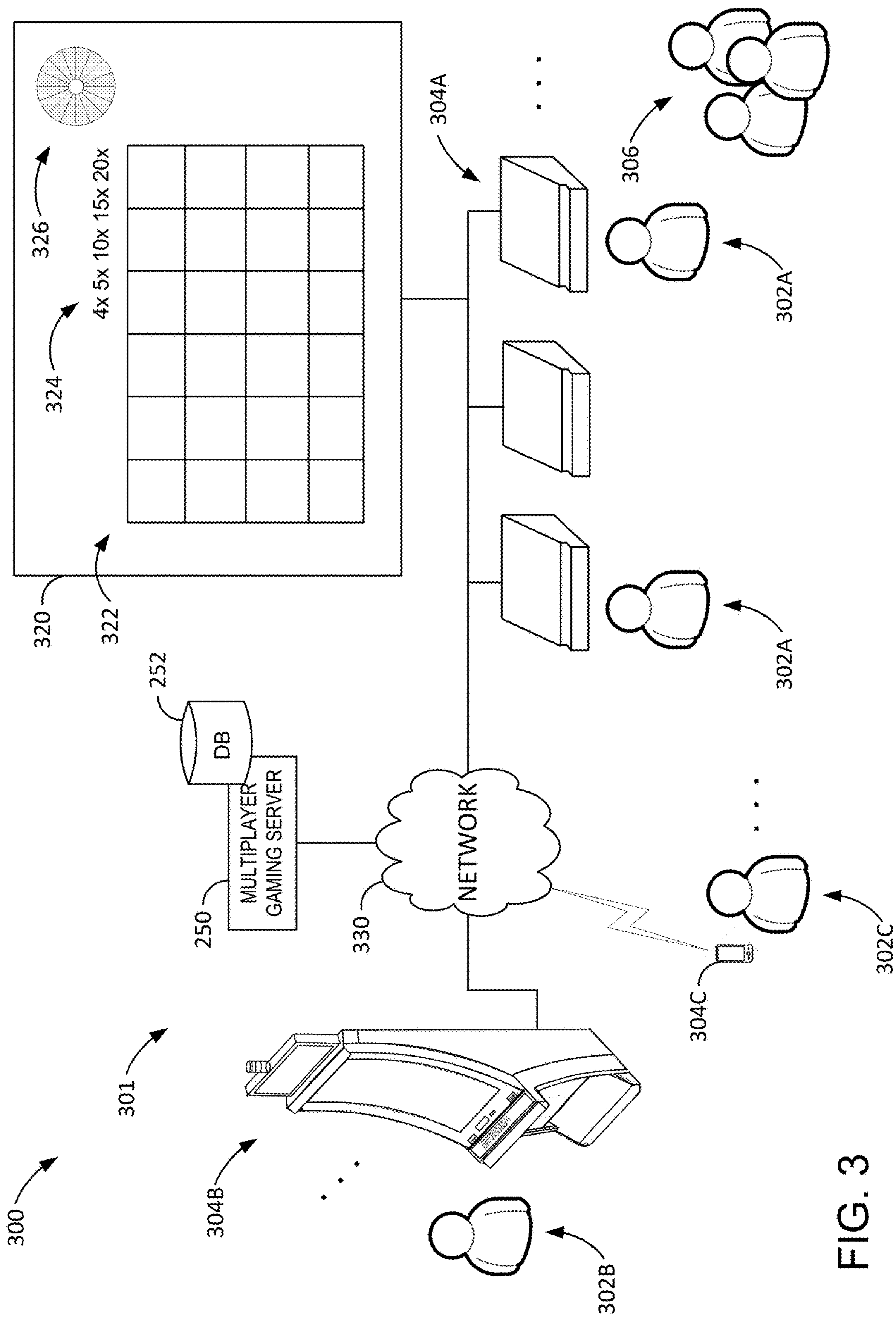
FIG. 3 illustrates a networked environment of a communal gaming system in which the communal gaming server provides a communal game to various players of various participating devices.

FIG. 3 illustrates a networked environment 301 of a communal gaming system 300 in which the multiplayer gaming server 250 provides a communal game to various players 302 of various participating devices 304. In this example, the communal game is a Ca$h Wall game in which participating players 302 win spots on a play area 322 during play of their primary games. Other communal games are possible in conjunction with the communal gaming system 300. In the example embodiment, various gaming devices 104, 200 participate in the communal game. Such gaming devices 104, 200 may include bar top gaming devices 304A, upright gaming devices 304B, and mobile computing devices 304C (collectively referred to as "participating devices 304"). The bar top gaming devices 304A and upright gaming devices 304B are physically networked together in network 330, which may be similar to or otherwise include network 214. In addition, mobile computing devices 304C may be wirelessly connected to network 330 (e.g., via cellular network, public or private WiFi, or any such network architecture that enables aspects of the communal gaming system as described herein). In this example, bar top players 302A are playing various primary games on the bar top gaming devices 304A (e.g., video poker, video black jack, video slots, and such), upright players 302B are playing various slot style primary games at upright gaming devices 304B, and mobile players 302C are playing various mobile primary games on mobile computing devices 304C. Players 302A, 302B, 302C may be referred to collectively herein as "players 302" or "participating players 302."

In the example embodiment, the communal gaming system 300 also includes a communal display device (or just "communal display") 320. The communal display 320 is a display device (e.g., flat screen, curved screen, projection screen) that is configured to display aspects of the communal game for public viewing, both for participating players 302 as well as for other spectators 306. In some embodiments, the communal display 320 includes a computing device executing a communal game client for presenting the communal game play. The communal display 320, in this example communal game, presents a play area 322, a set of award multipliers 324, and an award wheel 326. The play area 322 defines a matrix of rows and columns, where each cell of the matrix represents a "spot" (not separately numbered in FIG. 3) that may be awarded to one of the participating players 302 during a game cycle of the communal game. The set of award multipliers 324 illustrates, to the players and other spectators 306, awards that are provided to vested players (e.g., those participating players 302 that were awarded a spot on the play area 322) during the game cycle of the communal game instance. The award wheel 326 may be used to provide a reward to any remaining spots that are not awarded from the set of award multipliers 324 (e.g., as "top winner(s)" of the current game cycle). In some embodiments, the play area 322 may be presented to players as a graphical user interface, allowing players to interact with aspects of the play area (e.g., picking vacant positions, selecting avatars, or such).

In the example embodiment, spots on the play area 322 (also referred to herein as the "Ca$h Wall") are awarded to various participating players 302 as they play their primary games on their various participating devices 304. Each participating gaming device 302 provides one or more primary games that are configured to allow for participation in the communal game. For example, bar top players 302 may be playing video poker, video keno, video black jack, video slots, or such, on the bar top devices 304A, upright players 302B may be playing slots on upright devices 304B, and mobile players 302C may be playing video keno or video roulette on their mobile devices 304C. Each type of game is configured with one or more trigger conditions that can occur during game play. Trigger conditions may include, for example, particular types of wins (e.g., 4-of-a-kind in video poker, drawing to a triple-7 21 in video black jack), particular types of game outcomes (whether wins or losses, e.g., 5 cards without busting in video black jack), or a randomized trigger condition from an RNG (e.g., 0.1% chance per play). Further, the various players 302 may be playing using various types of currencies ("native currency" of the primary game, e.g., real currencies, virtual currencies, loyalty points, comp points, tokens, or such) and may participate in the communal game in those various currency types.

In some embodiments, the communal gaming system 300 is configured with direct trigger conditions ("direct triggering"), where the primary game is directly programmed with trigger conditions that award communal game participation. For example, the primary game may be a video slot game programmed with communal game symbols on one or more reels, and participation in the communal game may be triggered when the communal game symbol appears a pre-determined number of times in a game outcome (e.g., three communal game symbols appearing anywhere), on a pre-determined number of reels (e.g., one or more communal game symbols appearing on at least three reels), or a pre-determined number of stacks of communal game symbols (e.g., three or more reels filled with communal game symbols). In another example embodiment, a video poker-style game presents a coin above each of five cards dealt to the player during a hand. The game is programmed to display each coin flipping and landing heads or tails (e.g., for all hands, for hands achieving jacks or better during game play, or such), and a trigger condition is configured to award participation in the communal game when five heads or five tails are achieved. In another example, a keno-style game is configured to occasionally provide communal-themed keno balls (e.g., different-colored balls), and the appearance of pre-determined numbers of communal keno balls triggers participation. As such, the primary game itself is directly configured with trigger conditions for communal game participation, and to interact with the multiplayer game server 250 and award participation in the communal game.

In some embodiments, the communal gaming system 300 is configured with indirect trigger conditions ("indirect triggering"), where the primary game operates independent of the communal game but where the communal gaming system 300 inspects results of the primary game and awards communal game participation based on certain native outcomes occurring within the primary game (e.g., based on the normal game play rules of the primary game). In such indirect embodiments, the primary game operates independent of the communal game, and the communal gaming system 300 allows participation in the communal game through inspection of primary game outcomes and awarding of communal game participation based on the primary game outcomes. In one example embodiment, a slot-style game is programmed with a 5×3 reel format, where the reels include feature game symbols that may appear during primary game play. A trigger condition may be configured to award participation in the communal game when feature game symbols appear a pre-determined number of times in a game outcome (e.g., three feature game symbols appearing anywhere), on a pre-determined number of reels (e.g., one or more feature game symbols appearing on at least three reels), or a pre-determined number of stacks of feature game symbols (e.g., three or more reels filled with feature game symbols). As such, the primary game itself need not be reprogrammed to support the communal game. Instead, the communal gaming system 300 and associated communal game play can be overlaid onto operation of existing games.

In some embodiments, in addition to awarding participation in the communal game, various trigger conditions may be configured to provide enhanced participation. For example, in addition to providing a spot on the Ca$h Wall, three full reels of communal game symbols may provide a 1× multiplier, four full reels of feature game symbols may provide a 2× multiplier, and five full reels of feature game symbols may provide a 3× multiplier (e.g., multiplying the ante bet amount to determine the bet value placed on the Ca$h Wall). In some embodiments, in the coin flip video poker example described above, five heads-up coins provides a 1× multiplier, five heads-up coins plus a particular native hand (e.g., three of a kind or better) provides a 2× multiplier, and five heads up coins plus another particular native hand (e.g., full house or better) provides a 3× multiplier. In some embodiments, the player may select whether they wish to use heads or tails. In some embodiments, held cards retain their original flip result while redrawn cards cause a reflip of the associated coin. In some embodiments, any heads are held and all non-heads are reflipped after a draw. In some embodiments, a keno style game may provide various multipliers based on a number of feature game balls that appear during the draw (e.g., three or more for 1× multiplier, five or more for 2× multiplier, seven or more for 3× multiplier).

In some embodiments, the primary game may allow the player to submit an additional wager that activates a "nudge" feature for the reels, where the nudge feature causes one or more reels to shift up or down one space to complete a full stack if the reel stops on an almost-complete stack (e.g., one feature game symbol short), thus allowing the player to increase their chances of winning participation in the communal game (e.g., nudging a reel to satisfy an initial participation trigger condition) or increasing the value of their participation in the communal game (e.g., nudging a reel to increase to a higher multiplier).

In some embodiments, the participating device 304 automatically provides eligibility to participate in the communal game (e.g., making the trigger condition(s) always active and available during primary game play). In other embodiments, the participating device 304 may require an additional side bet (e.g., an additional $1) or a minimum ante bet (e.g., max bet) for communal game eligibility. In some embodiments, an operator may activate communal game eligibility on any of the participating devices 302 at periodic times (e.g., happy hour, tournament event, social event, during a particular sports event).

When a participating player 302 achieves a trigger condition during primary game play, the communal gaming system 300 awards the player 302 with participation in the communal game. In the example communal game, participation in the Ca$h Wall game includes a spot on the play area 322 of the Ca$h Wall game. Another communal game that may be provided by the communal gaming system 300 may be a communal buffalo chase game in which primary game play awards a buffalo in a multiplayer race. When the buffalo chase game begins, all of the vested players may use one or more buttons at their local gaming devices 200 to spin reels or otherwise power their buffalo. Players may be awarded based on their finish in the race. Another communal game that may be provided by the communal gaming system 300 may be a communal slot game. For example, the play area 322 may include a set of slot reels that spin and are resolved on a periodic basis (e.g., every 5 seconds). Participation in the communal slot game is provided for one or more cycle of the slot game (e.g., one or more spins). When participation is awarded, the avatar of the player 302 may be displayed near the reels. When the multiplayer gaming server 250 spins and stops the reels, all currently-vested players receive the award provided (e.g., based on their base value). In some embodiments, the avatars of each of the winning players may be added to one or more positions on the reels and any player's avatars showing after the spin is resolved are awarded for that game cycle. In the example embodiment, a vacant spot is randomly selected for the winning player. In some embodiments, the winning player is allowed to select a vacant spot on the play area 322. In other embodiments, spots are selected in a pre-determined order (e.g., left to right, top to bottom). When a participating player 302 wins a spot on the play area 322, the player is said to be "vested" in the spot, and the spot is henceforth considered "occupied" for the current game cycle.

In the example embodiment, the play area 322 displays information within each vacant and occupied spot, allowing spectators 306 to follow the action and participating players 302 to both see the current status of the game cycle as well as view their own vested spot(s) on the play area 322. Vacant spots may appear blank, or may display a spot number or other unique identifier. Occupied spots contain information about the vested player and the vested award. For example, each occupied spot may display a base value (e.g., $1, $5, 10 loyalty points), an icon indicating in which type of primary game the spot was awarded, an avatar associated with the vested player for that spot, and possibly a background or border color or other identifying markings (e.g., a player moniker such as "SlotMonster45" or "Dallas Donny"). The base value is a base amount (e.g., in real currency, loyalty points, comp points, virtual currency, tokens, trophies, or such) that is vested value in the spot (e.g., a minimum award value for that vested player). The base value may be a fixed amount (e.g., $2, $5), may be a randomized amount (e.g., randomly selected within a range of $1 to $10, randomly selected from a set of available base values). In the example embodiment, the base value is based on an ante bet amount provided during the primary game play round in which the player 302 was awarded the spot (e.g., the primary wager made by the player during a play of the primary game, in real currency, virtual currency, points, or such). In this example, the base amount may be multiplied by one of the award multipliers to determine an award value during play of the current communal game cycle. The avatar and background or border color are used to help vested players distinguish which spots are theirs. Each participating player 302 may choose, and in some embodiments customize, a favorite avatar (e.g., from a selection of provided avatars) and background or border color such that they can easily identify their vested spots. In some embodiments, the won spot may display an animation of the avatar when the player 302 wins the spot.

At the beginning of a game cycle of the communal game, the multiplayer gaming server 250 resets the communal game (e.g., vacates all spots in the play area 322), updates the play area 322, and opens a registration window for the current game cycle or otherwise begins accepting participation trigger messages. The registration window is a period of time in which participating devices 304 can achieve trigger conditions and be awarded spots in the current game cycle.

While the play area 322 is not yet full (or while the registration window remains open), and as participating players 302 are playing their primary games, the multiplayer gaming server 250 receives participation trigger messages or otherwise identifies the occurrence of trigger conditions on any of the various participating devices 304 and manages spot allocation on the play area 322 for winning players. In the example embodiment, the participating devices 304 each include a communal gaming client (not separately shown in FIG. 3) that is configured with trigger conditions for the primary games they provide. During primary game play, the community gaming client of the participating device 304 determines eligibility of the local participating player 302 for participation in the communal game. When eligible, the community gaming client may monitor primary game play outcomes on the local participating device 304 (e.g., in indirect triggering), or the primary game may monitor primary game play outcomes (e.g., in direct triggering), comparing each primary game play outcome to the trigger conditions(s) for that primary game. In some embodiments, the participating device 304 may generate a separate RNG call to determine whether the trigger condition occurs.

When a trigger condition is detected, the participating device 304 transmits a communal participation trigger message (e.g., a spot win message for Ca$h Wall) to the multiplayer gaming server 250 to begin awarding a spot on the play area 322 for this win event. The spot win message identifies the participating device 304 (e.g., a unique device identifier (ID)) and may identify the winning player (e.g., a loyalty player ID), an avatar ID for the winning player, and an ante bet amount wagered by the participating player 302 during the winning primary game play round. The multiplayer gaming server 250 generates an entry in the current communal game cycle for the participating device 304 and stores the machine identification information, player identification information, and ante bet amount as a base value for the entry. In some embodiments, the ante bet amount may be multiplied by a multiplier (e.g., based on the triggering event) to determine the base value for the entry. The multiplayer gaming server 250 may also generate and store a unique identifier for the entry ("communal entry ID") and for the communal game cycle of this instance (instance ID, "communal cycle ID"). For identified players (e.g., players with a loyalty ID), the multiplayer gaming server 250 may retrieve a favorite avatar and background or border color of the participating player 302 for use on the play area 322. For anonymous players (e.g., unidentified players, players without a loyalty ID), the multiplayer gaming server 250 may select an avatar and background or border color (e.g., based on avatars and background or border colors not currently in use during the current communal game cycle). In some embodiments, anonymous players may be allowed to select an avatar and a background or border color.

In the example embodiment, the communal gaming system 300 automatically selects and assigns a vacant spot on the play area 322 to a winning player. In other embodiments, the communal gaming system 300 allows the winning player 302 to select which vacant spot on the play area 322 they wish to occupy. More specifically, the multiplayer gaming server 250 transmits current play area information to the winning device 304 (e.g., a list of occupied spots, a list of vacant spots, spot information for occupied spots such as base values, avatars, and background or border colors). The winning device 304 receives the current play area information and the communal gaming client displays a graphical representation of the play area 322 on the local device 304 (e.g., similar to play area 322 shown on the communal display 320). The graphical representation allows the winning player 302 to select which vacant spot they wish to occupy (e.g., via a touch screen interface). The winning device 304 transmits a spot request message back to the multiplayer gaming server 250 indicating the selected spot. If the selected spot is still vacant, the multiplayer gaming server 250 allocates the selected spot to the entry, updates the entry with a spot ID of the allocated spot, and populates the spot on the play area 322 with the various spot information (e.g., avatar of the vested player, bet value of the entry, an icon indicating in which type of primary game the spot was awarded, background or border color, player moniker, and so forth). The multiplayer gaming server 250 may transmit a participation award message back to the winning device 304, after which the communal gaming client may display confirmation to the winning player 302 that the spot has been successfully allocated. As such, the selected spot becomes occupied by the winning player 302. If the selected spot is no longer vacant, the multiplayer gaming server 250 transmits a denial message back to the winning device 304 along with updated play area information. The communal game client may then update the play area displayed on the winning device 304 and allow the winning player to attempt selection of another vacant spot. In some embodiments, if the initially selected spot is not available, the multiplayer gaming server 250 may automatically assign another vacant spot to the entry. In some embodiments, if only one spot remains vacant, the multiplayer gaming server 250 may automatically assign the last vacant spot to the entry. Such automatic assignment may help speed up game play and reduce player frustration. The multiplayer gaming server 250 transmits a participation award message back to the winning device 304 to confirm participation and associated details to the player.

In some situations, due to timing of multiple contemporaneous trigger conditions occurring on multiple participating devices 304, a winning player 302 may appear to win during the current communal game cycle (e.g., while one or more vacant spots appear available) but the multiplayer gaming server 250 may have received other communal spot win message from another participating device 304 just prior. As such, the unallocated entry is not able to be added to the current communal game cycle. Similarly, some trigger conditions may occur on participating devices 304 while the current communal game cycle is being played and resolved. In some embodiments, the multiplayer gaming server 250 may queue up each "queued participation" (e.g., spot wins) for processing in the next communal game cycle. In the example embodiment, the multiplayer gaming server 250 may immediately begin processing the next game cycle when the registration window for the current game cycle closes and play begins (e.g., illustrating to the winning players their spot in the next game cycle). As such, the multiplayer gaming server 250 may create an empty play area for the next game cycle and allows queued or incoming participation awards to be allocated to that next game cycle. Such immediate processing may reduce player frustration at being queued or held while game play is conducted for the current game cycle.

In the example embodiment, the multiplayer gaming server 250 keeps the registration window open until all of the spots on the play area 322 are occupied. In some embodiments, the multiplayer gaming server 250 may close the registration window for the current game cycle after a pre-determined amount of time (e.g., 5 minutes, 15 minutes), thereby providing a fixed amount of time to wait until the current game cycle is played and resolved. In some embodiments, the multiplayer gaming server 250 may close the registration window based on a predetermined period of inactivity (e.g., if no spots have been awarded in the last 1 minute, in the last 5 minutes), thereby providing more timely game resolution in less active periods. In situations when the registration window is closed prematurely (e.g., before all spots are occupied), in some embodiments, the multiplayer gaming server 250 may leave those spots unvested, and thus no awards will be issued for those spots. In other embodiments, "dummy" bets may be added to occupy one or more spots ("dummy spots") (e.g., to provide the appearance of being occupied). The dummy spots are not associated with any real player, and thus result in no actual award during resolution of the current game cycle. In some embodiments, dummy spots may be periodically added to the play area 322 (e.g., to quicken game play, to give the appearance of greater activity, to heighten excitement). For example, the multiplayer gaming server 250 may be configured to enter a dummy spot onto the play area 322 on a periodic or semi-random basis (e.g., every 1 minute, every 5 minutes plus or minus 0 to 60 seconds).

Upon closing the registration window, the multiplayer gaming server 250 conducts game play for the current communal game cycle. In the example embodiment, the communal game play for the current game cycle includes multiple rounds of play. In each round of play, the multiplayer gaming server 250 identifies an award for the round ("round award") and selects one or more rows or columns to identify a set of winning spots for that round (e.g., where all of the spots in the selected row(s) and columns(s) become winning spots for that round). In the example embodiment, during the first pre-determined number of rounds (e.g., five rounds), the round award is a pre-defined multiplier for each round (e.g., "4×" for the first round, "5×" for the second round, and so forth, from the set of award multipliers 324 from a pay table). To select the winning rows or columns for that round, in one embodiment, the multiplayer gaming server 250 randomly selects one or two rows or columns (e.g., one row, two rows, one row and one column, one column, or two columns, based on an RNG result) still having at least one active, unawarded spot. In some embodiments, the multiplayer gaming server 250 selects one or two rows or columns based on base values of the unawarded spots remaining in those rows or columns (e.g., to control RTP). In some embodiments, a highlight animation is displayed (e.g., by a game client running on the multiplayer gaming server 250, on the participating devices 304, or on an multiplayer display controller 620 shown in FIG. 6), presenting a highlight animation presentation during each round of play highlighting various pairs of rows and columns at a decreasing frequency, slowing until the selected winning rows and columns stay highlighted to conclude the round. In some embodiments, as rows and columns are highlighted, the highlighted spots may be displayed as magnified (e.g., visually enlarged), or base values may be temporarily converted and displayed as multiplied values (e.g., base value multiplied by the current round multiplier), thereby increasing anticipation in game outcome. In some embodiments, some rounds may only highlight an individual row or column (e.g., during later rounds, when there are few unawarded spots still remaining).

In the example embodiment, the multiplayer gaming server 250 awards multipliers from the set of award multipliers 324 in increasing order. For example, the 4× award multiplier is awarded in a first round of play, the 5× award multiplier is awarded in a second round of play, the 10× award multiplier is awarded in a third round of play, and so forth. Such progression both serves to control RTP (e.g., because more winning spots are selected in earlier rounds compared to later rounds) as well as increasing excitement and anticipation for participating players 302 and spectators 306 (e.g., particularly for those players remaining for the next round). In some embodiments, the multiplayer gaming server 250 may determine and award the multipliers in a different order (e.g., determined randomly, pre-selected based on controlling RTP). The multiplayer gaming server 250 may display the award multiplier over the winning spots for that round, further identifying how the award multiplier is applied to each winning spot during that round, thus increasing understanding of the communal game to both participating players 302 and spectators 306. In the example embodiment, the set of award multipliers is pre-determined and fixed (e.g., 4×, 5×, 10×, 15×, 20×). In some embodiments, the communal gaming system 300 may allow the operator to configure the number of rounds, the award multiplier, or aspects of RTP for the communal game. In some embodiments, the set of award multipliers may be dynamically determined at the beginning of the game cycle (e.g., based on a pool of funds available for the game cycle, based on a frequency of primary game play, based on a frequency of communal game play, based on a rate of communal game participation).

After identifying the winners of a particular round, the multiplayer gaming server 250 determines an award value for some or all of the spots (e.g., by multiplying the base value of the spot by the award multiplier won during that game round). The multiplayer gaming server 250 stores the award value with the entry and deactivates any of the winning spots for that round (e.g., blanking or darkening the winning spots) to visually indicate that those spots are no longer active for the current game round. Each of the remaining, unawarded spots remains active and available to win the next round of play in the current game cycle. The multiplayer gaming server 250 advances to the next round of play, similarly selecting one or two rows or columns from in the play area 322 and awarding the next multiplier to the winning spots. As the game play progresses, less spots remain active at each subsequent round as the multipliers increase until the final multiplier is awarded. In some situations, there may be one or more unawarded spots remaining after the final multiplier is awarded. In the example embodiment, the remaining spot(s) may be awarded a multiplier, jackpot, or fixed value based on a spin of the award wheel 326 (e.g., a higher multiplier than the highest multiplier of the award multipliers 324). For example, the remaining spot(s) may be awarded a multiplier selected from a weighted table using an RNG output. In some embodiments, each remaining spot may be awarded a pre-determined award amount (e.g., $100, 100 loyalty points). In other embodiments, each remaining spot may be awarded an award amount dynamically determined based on a pool of communal game funds (e.g., a percentage of the remaining pool of funds matching the currency type of the spot). In some embodiments, remaining spots may be awarded merchandise, hotel or casino credits, food or drink credits, or other value. In some embodiments, the operator may advertise a grand prize for a particular communal game cycle (e.g., an autographed sports jersey for a game cycle conducted during a sporting event).

During the communal game play, the participating devices 304, or particularly any devices 304 that are associated with a spot in the current game cycle, may present the game play of the communal game on the local device 304 to allow the player 302 to watch along (e.g., in case they cannot see the communal display device 320). The multiplayer gaming server 250 may transmit game play actions and results to the participating devices 304 such that the local communal game clients can present an image similar to or the same as what is seen on the communal game display 320. As such, active players can witness the communal game play, identify when their spot(s) win, and see which multiplier they won.

In the example embodiment, each spot on the play area 322 receives an award. After conclusion of a particular game round, or the game cycle as a whole, the multiplayer gaming server 250 transfers the award value to the winning players. In some situations, the winning player for a given entry may still be playing at the winning device 304 (e.g., in a continuous, unbroken game play session since the entry was entered). As such, the multiplayer gaming server 250 may verify the unbroken play session for that winning device 304 and transfer the award value to the winning device 304 as machine credit. The communal game client may present a display of the awarded value to illustrate to the winning player the additional credit added to their current credit total. In some situations, the winning player for a particular entry may have left the winning device 304 but may be presently playing at another participating device 304. The multiplayer gaming server 250 may identify the relocated player based on the winning player having presented their player loyalty card at their current device 304 (e.g., using the stored player ID for identification). If the winning player associated with the entry is located and active at another participating device 304, the multiplayer gaming server 250 may similarly transfer the award value to the current device 304 of the winning player, and the local communal game client may similarly display the game player or the win result.

In some situations, the winning player for a particular entry is an identified player (e.g., a loyalty player), but is no longer active at a participating device 304. In the example embodiment, the award value for that entry may be transferred into an account of the identified player (e.g., a house account managed by the casino or tavern). In some embodiments, the identified player may have a communal game app or digital wallet app installed on their mobile device 304C and the multiplayer gaming server 250 may transmit a win result message to the mobile device 304C indicating the win result and the transfer via the communal game app or digital wallet app. In some embodiments, the multiplayer gaming server 250 may transmit an email or text message to the identified player. In some embodiments, the multiplayer gaming server 250 may retain the award for later presentation to the identified player. For example, the multiplayer gaming server 250 may queue the award and present the award to the player when they later card into another gaming device 200. In some embodiments, the gaming device 200 prints out a valueless cashable coupon identifying the spot and the player may redeem the coupon for the winnings they received from the spot at a later time (e.g., by presenting the coupon to the gaming device 200).

In some situations, an identified or anonymous player may have one or more vested spots in a communal game cycle but may quit their current gaming session at the winning device 304. In the example embodiment, when the player quits their current gaming session (e.g., reduces their balance to zero, tickets out of the winning device 304), the local communal game client alerts the player of their vested interest in spot(s) on the current communal game cycle and presents an offer to divest from their active spot(s). If the player chooses to divest, the communal game client transmits a divest message to the multiplayer gaming server 250 identifying the divested spot. In some embodiments, the multiplayer gaming server 250 may compute an average expected value for the vested spot(s) and allow the player the option to accept that expected value. For example, the vested player may be awarded an average expected value as the sum of the bet value multiplied by each multiplier and by the percentage chance of achieving that multiplier, for each potential multiplier. In some embodiments, the multiplayer gaming server 250 may transfer a divest amount to a Personal Banker player tracking account for later redemption. In some embodiments, the player forfeits their spot and the winnings of the spot may be awarded randomly to another player in the current or a later game cycle or may be added to a progressive jackpot which may later be awarded to another player. In some embodiments, the multiplayer gaming server 250 may transfer the base value in credit to the winning device 304, allowing the player to use or take away that base value (e.g., via ticketing out). In some embodiments, the multiplayer gaming server 250 may transfer the minimum award amount to the player (e.g., with 4× multiplier applied as the lowest amount the player would have won). In some embodiments, a difference between the divested amount given to the player and the actual award amount won by the spot (e.g., during game play of the current cycle) is forfeited by the player and may be randomly provided to another player in the current or a later game cycle or may be added to a progressive jackpot which may later be awarded to another player.

In the example embodiment, when a spot is divested, the spot remains occupied in the current game cycle. However, since no player is vested in the spot, the spot effectively becomes a dummy spot. Leaving the spot as an occupied dummy spot allows the game cycle to continue to progress even if some players divest, thereby continuing the progression to game play and avoiding player frustration. In other embodiments, when a spot is divested, the spot is vacated for the current game cycle, allowing other players to subsequently occupy that spot. In some embodiments, the multiplayer gaming server 250 may dynamically determine whether to leave the spot occupied or vacate the spot for another winner. For example, the multiplayer gaming server 250 may compare a spot win rate or frequency to a pre-determined threshold and, if spots are being won more frequently than the pre-determined threshold (e.g., the game is progressing at an adequate rate), then the multiplayer gaming server 250 may vacate the spot. If the game is progressing slowly (e.g., below the pre-determined threshold), then the multiplayer gaming server 250 leaves the divested spot as an occupied dummy spot.

In some embodiments, the communal game allows an already-vested player (e.g., a player with at least one spot already in the play area 322) to increase the base value of an existing spot on the play area 322 instead of receiving another spot. For example, presume a player is awarded participation in the communal game, winning a spot on the play area 322 with a base value of $2. Subsequently, the same player is awarded participation in the communal game again with a base value of $3. In some embodiments, the multiplayer gaming server 250 may allow the player to choose to either take another spot on the play area 322 or to increase the value of their existing spot. If the player chooses to take another spot, then they would be vested in a $3 spot on the play area 322. If, however, the player chooses to increase the value of their existing spot, then the multiplayer gaming server 250 adds $3 to the original base value of $2, making their existing spot a base value of $5. In some embodiments, the multiplayer gaming server 250 may automatically increment an existing spot with a new base value when the player already has a vested spot on the board. In some embodiments, the communal game may be configured to only allow incrementing of existing spots up to a certain dollar value. In some embodiments, the communal game may provide a diminishing return with incrementation over a certain pre-determined threshold. For example, if the existing spot is already $5 or greater, then a second win of $4 may only yield a $2 increment of the existing spot.

Figure 4A:
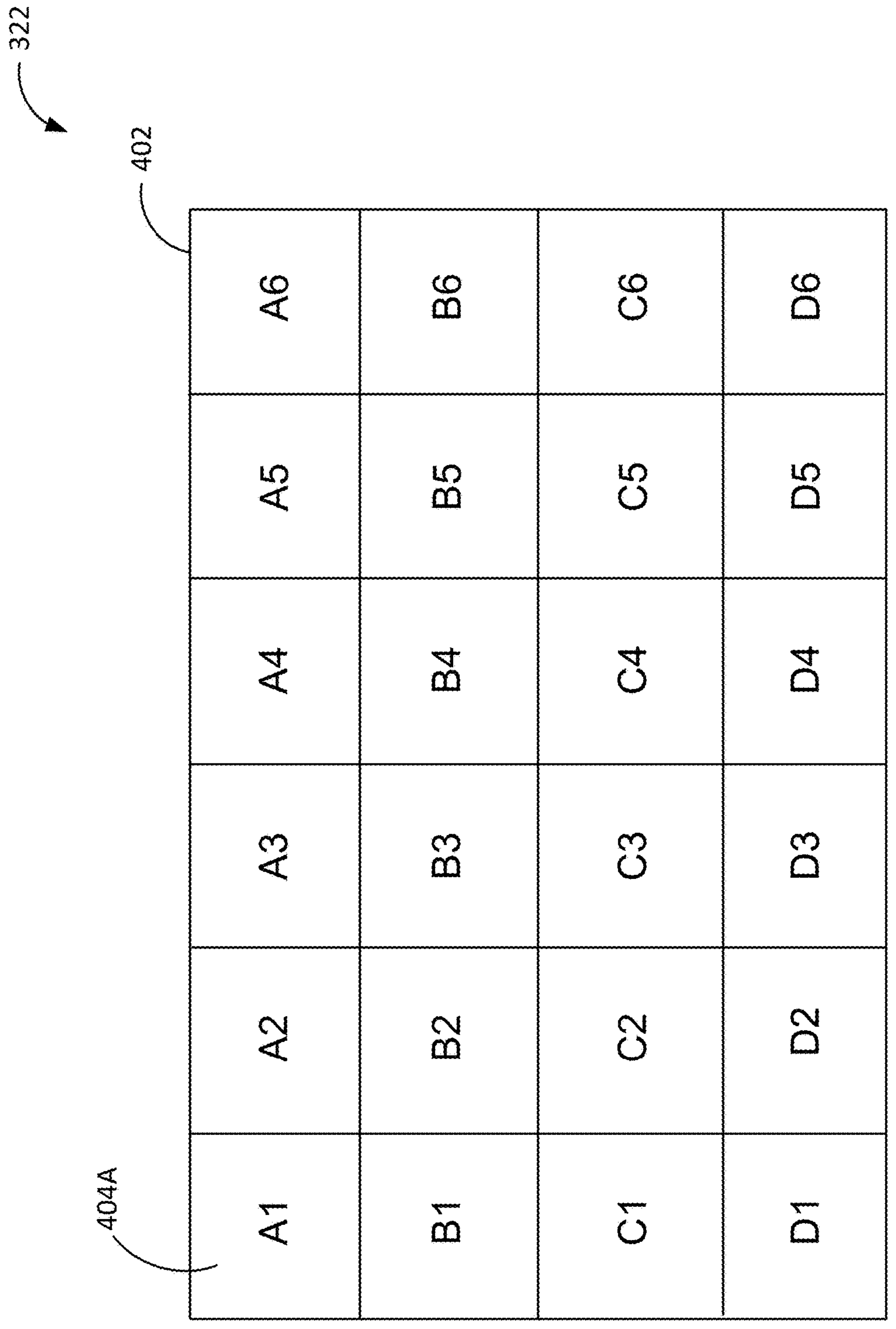
FIGS. 4A and 4B are diagrams illustrating the game play area of the example communal game provided by the communal gaming server.
Figure 4B:
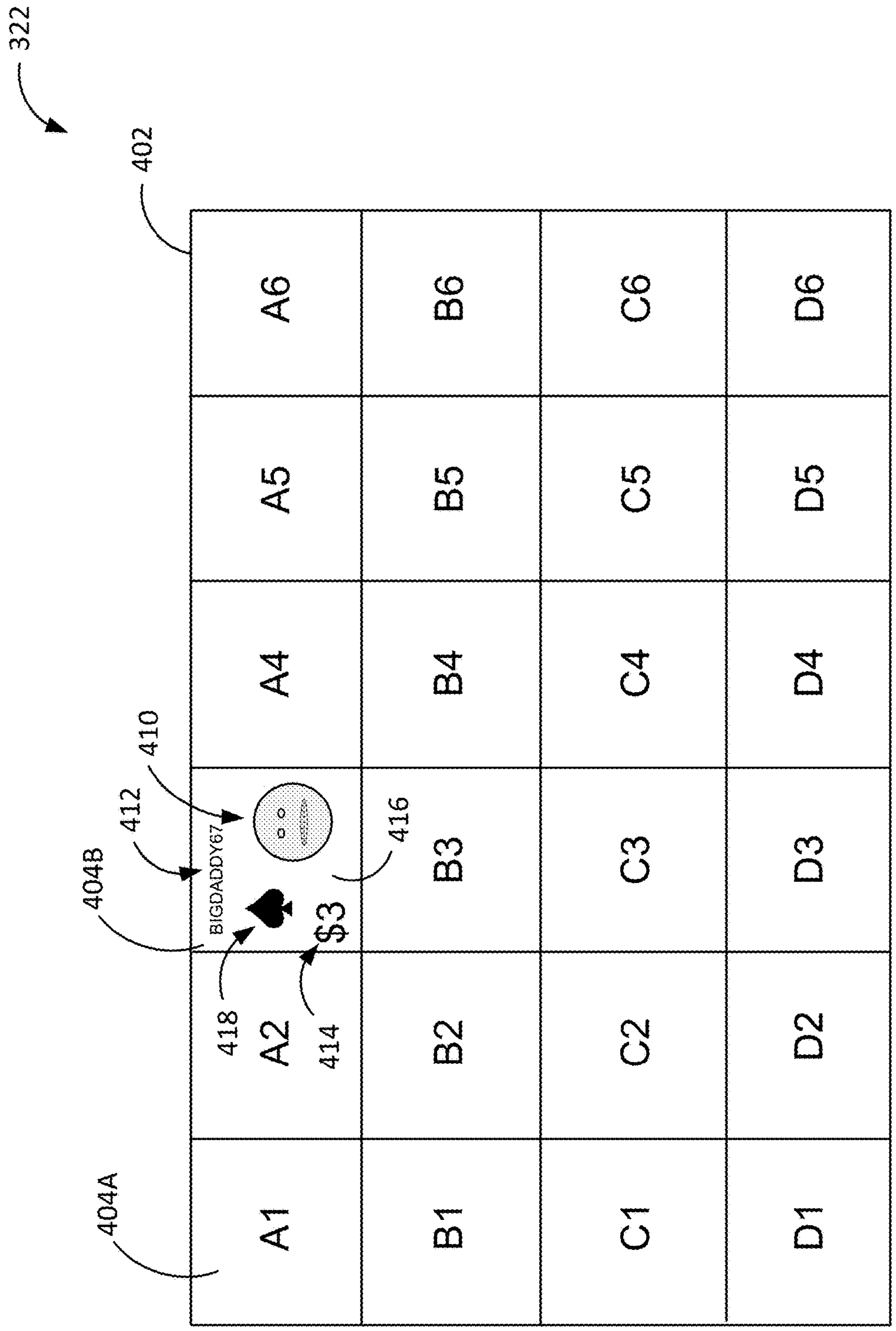

FIGS. 4A and 4B are diagrams illustrating the game play area 322 of the example communal game provided by the multiplayer gaming server 250. In the example embodiment, the communal game is a Ca$h Wall game which uses a matrix 402 of spots 404 for the play area 322. The example play area 322 includes four rows “A” to “D” and six columns “1” to “6”, with each of the spaces labelled by their row and column (e.g., “A1” through “D6”). While the example play area 322 is depicted as a 4×6 matrix, it should be understood that other matrix widths and heights may be used.

FIG. 4A depicts the play area 322 in an initial (e.g., empty) configuration. In other words, all of the spots 404 in FIG. 4A are vacant spots 404A. In the example embodiment, the multiplayer gaming server 250 displays a unique spot ID in each spot (e.g., a number assigned to each spot 404 in the matrix, or the row/column ID as shown in FIG. 4A). The spot ID may be used by the multiplayer gaming server 250 and participating players 302 to uniquely identify particular spots 404 during game play. The multiplayer gaming server 250 begins a new game cycle of the communal game with vacant spots 404A when the registration window for that game cycle opens.

In some embodiments, one or more spots 404 may be pre-designated (e.g., at the beginning of a communal game cycle) as “enhanced spots.” Such enhanced spots may display a premium award symbol identifying that the enhanced spot is associated with a premium award (e.g., a promotional item). In some embodiments, a pre-determined number of enhanced spots are determined prior to a communal game cycle (e.g., randomly). In some embodiments, each row or column may contain one enhanced spot. In some embodiments, spots may be enhanced upon player selection of the spot (e.g., randomly). In some embodiments, spots may be chosen and enhanced upon selection of a row or column (e.g., an additional “2×” being added to or multiplied into the enhanced spot(s) during each round of play for a particular cycle). Premium awards are awards over and above what is otherwise provided by the communal game play. In some embodiments, operators may fund premium awards from marketing funds (e.g., to avoid affecting the RTP of the game). Premium awards may include, for example, merchandise, bar drinks, food, loyalty points, additional native currency or multipliers, or such. For example, an operator may host a themed event during a particular sports event (e.g., during a hockey playoff game involving a local team). The operator may wish to give away hockey jerseys for the local team as incentives for play in the communal game. As such, a communal game cycle may be configured to add a team or jersey logo, or some other identifying symbol, as an enhanced spot symbol (or “premium award symbol”) to one of the vacant spots 404A. During game play, when the enhanced spot is awarded, the winning player is awarded the premium award. In such embodiments, player spot selection may be disabled and spots may be assigned randomly (e.g., to ensure the first awarded player does not take the premium award), or may use weighted assignment to favour certain players (e.g., based on loyalty participation, loyalty level). In some embodiments, winning the enhanced spot may cause no further multiplier to be awarded to that spot during game play for the game cycle (e.g., disabling the enhanced spot at the beginning of a first round of play). In other embodiments, the winner of the enhanced spot may continue to be vested in the spot for game play during the current game cycle, and as such may also receive a multiplier award or other award like the other spots during normal communal game play. In some embodiments, the enhanced spot may be predetermined by the multiplayer gaming server 250 but unidentified on the play area 322 (e.g., hidden from the players 302 and spectators 306). In such an embodiment, spot selection may be enabled since the location of the enhanced spot is hidden from the players. When the enhanced spot is selected, either by the player or automatically by the multiplayer gaming server 250, the premium award is revealed for that spot and the player associated with that spot is awarded the premium award.

FIG. 4B depicts the play area 322 after a first spot ("occupied spot") 404B has been awarded. When a spot is awarded to a player via their primary game, the multiplayer gaming server 250 displays a player avatar 410 of the winning player and a base value 414 associated with the entry. In the example embodiment, the base value 414 of an awarded spot is based on an underlying primary wager amount made by the player in their primary game when they were awarded the spot 404 (e.g., $3 wagered during the primary game). In some embodiments, the primary wager amount may be increased based on the triggering event. For example, in video slots, the base value 414 may be the primary wager amount multiplied by 1× if the player achieves 1× multiplier symbol in the primary game outcome, 2× if the player achieves a 2× multiplier symbol in the primary game outcome, or 3× if the player achieves a 3× multiplier symbol in the primary game outcome. Each triggering event may have an associated modifier to the primary wager amount to determine the base value 414 of the awarded spot 404. The multiplayer gaming server 250 may also display a particular background (or border color) on a background 416 or border of the occupied spot 404B to help the vested player identify their spot(s) on the play area 322. In some embodiments, a primary game symbol 418 may be displayed in the occupied spot 404B, identifying the type of primary game through which the spot was won (e.g., a "spade" symbol for video poker, a "7" symbol for slots, a "star" symbol for keno, a "21" for black jack, and so forth). In some embodiments, a player moniker 412 (e.g., "BIGDADDY67") may also be displayed in the occupied spot 404B to further help the vested player identify their spot(s).

As game play progresses, spots 404 are awarded to participating players 302 based on trigger conditions within their respective primary games. As such, vacant spots 404A become occupied spots 404B, with each occupied spot 404B displaying the avatar 410, base value 414, moniker 412, background or border color associated with the vested player for that spot, and the icon indicating in which type of primary game the spot was awarded. When the play area 322 is filled (e.g., when all spots 404 become occupied spots 404B) or when the registration window closes, game play for the current communal game cycle begins.

FIGS. 5A-5G are diagrams illustrating game play progression for an example game cycle of the Ca$h Wall communal game provided by the multiplayer gaming server 250. In the examples shown in FIGS. 5A-5G, unawarded spots are illustrated with only their associated base value 414 shown for ease of illustration, and awarded spots are illustrated as blank to indicate that the spot is no longer considered active for the current cycle of play (e.g., because each spot only receives one award). Further, while not shown in FIGS. 5A-5G, the row/column identifier shown in FIG. 4A may be used to refer to particular spots.

Figure 5A:
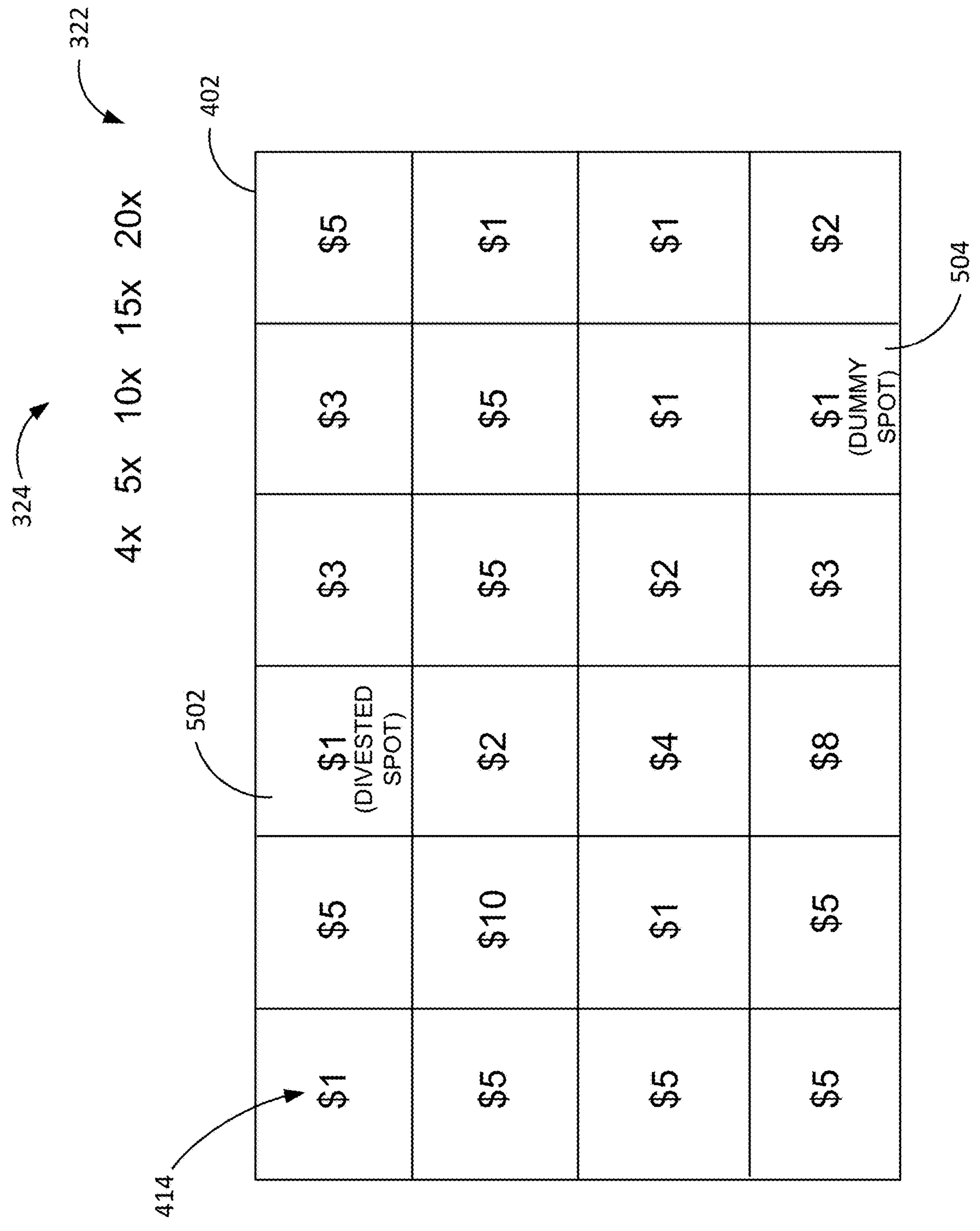
FIGS. 5A-5G are diagrams illustrating game play progression for an example game cycle of the Ca$h Wall communal game.

FIG. 5A depicts the play area 322 as fully populated, with all spots being occupied at the beginning of a first round of play of the current communal game cycle. In the example shown here, spot "A3" is a divested spot 502. In other words, the vested player for spot "A3" had previously been awarded the spot, but for whatever reason divested from the communal game cycle (e.g., receiving the $1 base value as credit, leaving the winning device 304, or such). The multiplayer gaming server 250, in this example, changed the "A3" spot to be divested (e.g., a dummy spot which will no longer yield an award to any player). Further, the play area 322 also includes a dummy spot 504. The dummy spot 504 was previously inserted by the multiplayer gaming server 250, for example, after a lengthy delay between spot awards, or after a timeout period for the game cycle. Like the divested spot 502, the dummy spot 504 also does not yield an award to any player.

Figure 5B:
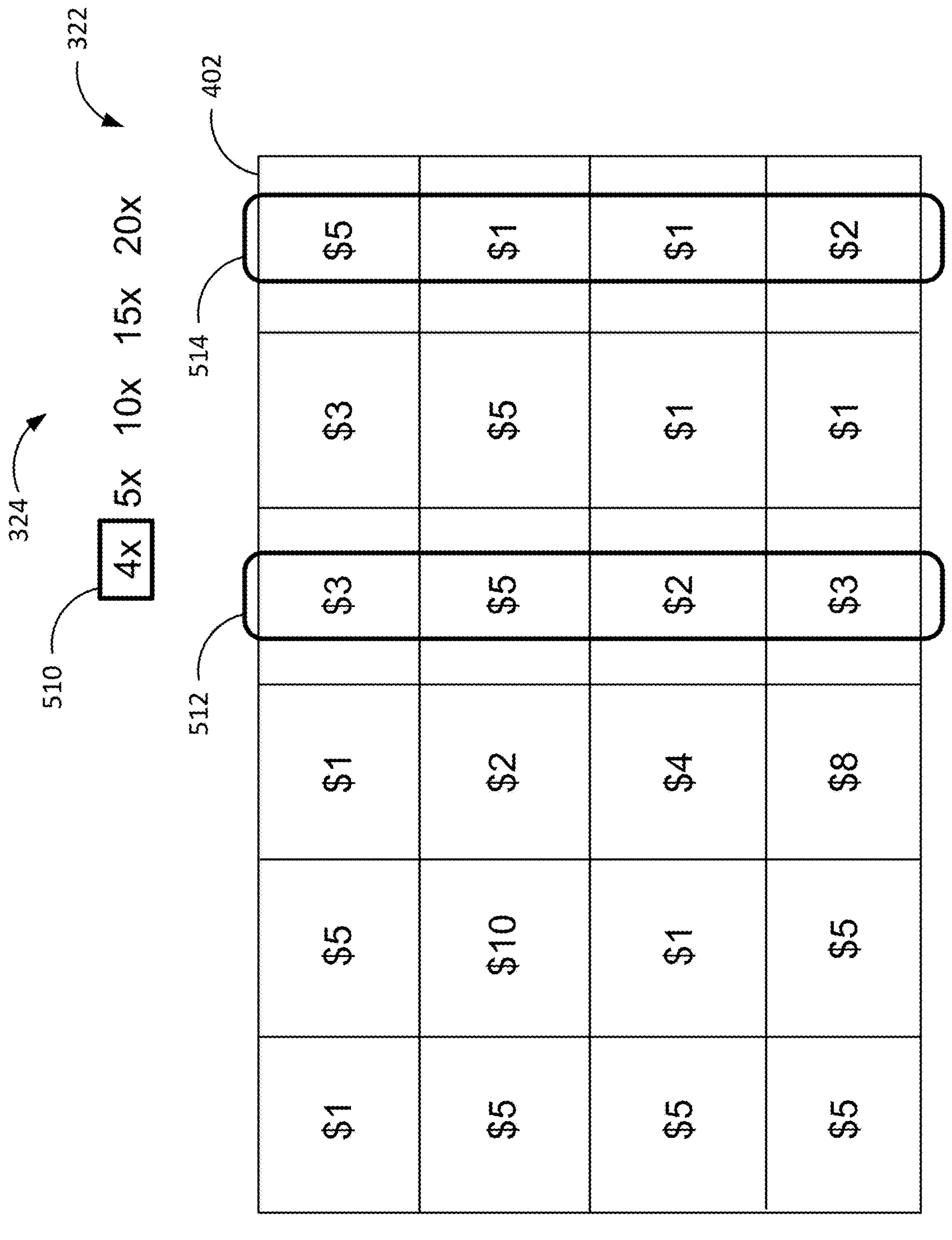

FIG. 5B depicts results of the first round of play of the current communal game cycle. In the example embodiment, the multiplayer gaming server 250 highlights the applicable award multiplier 510 (e.g., "4×") for the current round and selects a column 512 (e.g., column "4") and a column 514 (e.g., column "6") of the matrix 402. Each of the unawarded spots in the selected columns 512, 514 are awarded with the award multiplier 510 for the first round. As such, the multiplayer gaming server 250 multiplies the base value of each spot by the award multiplier 510 to determine an award value for that spot. In some embodiments, the multiplayer gaming server 250 may display the award multiplier 510 over each of the winning spots to highlight the award, or may display the computed award value in each of the spots to illustrate the total winnings of each spot. In some embodiments, the multiplayer gaming server 250 may display an avatar animation in each of the winning spots (e.g., each winning avatar cheering, saluting, clapping, or such). Once the first round is completed, the multiplayer gaming server 250 depicts the awarded spots in columns 512, 514 as having been awarded (e.g., clears the spots, mutes the colors of the spot, greys out the spots, or such) and marks each associated entry as having been awarded.

Figure 5C:
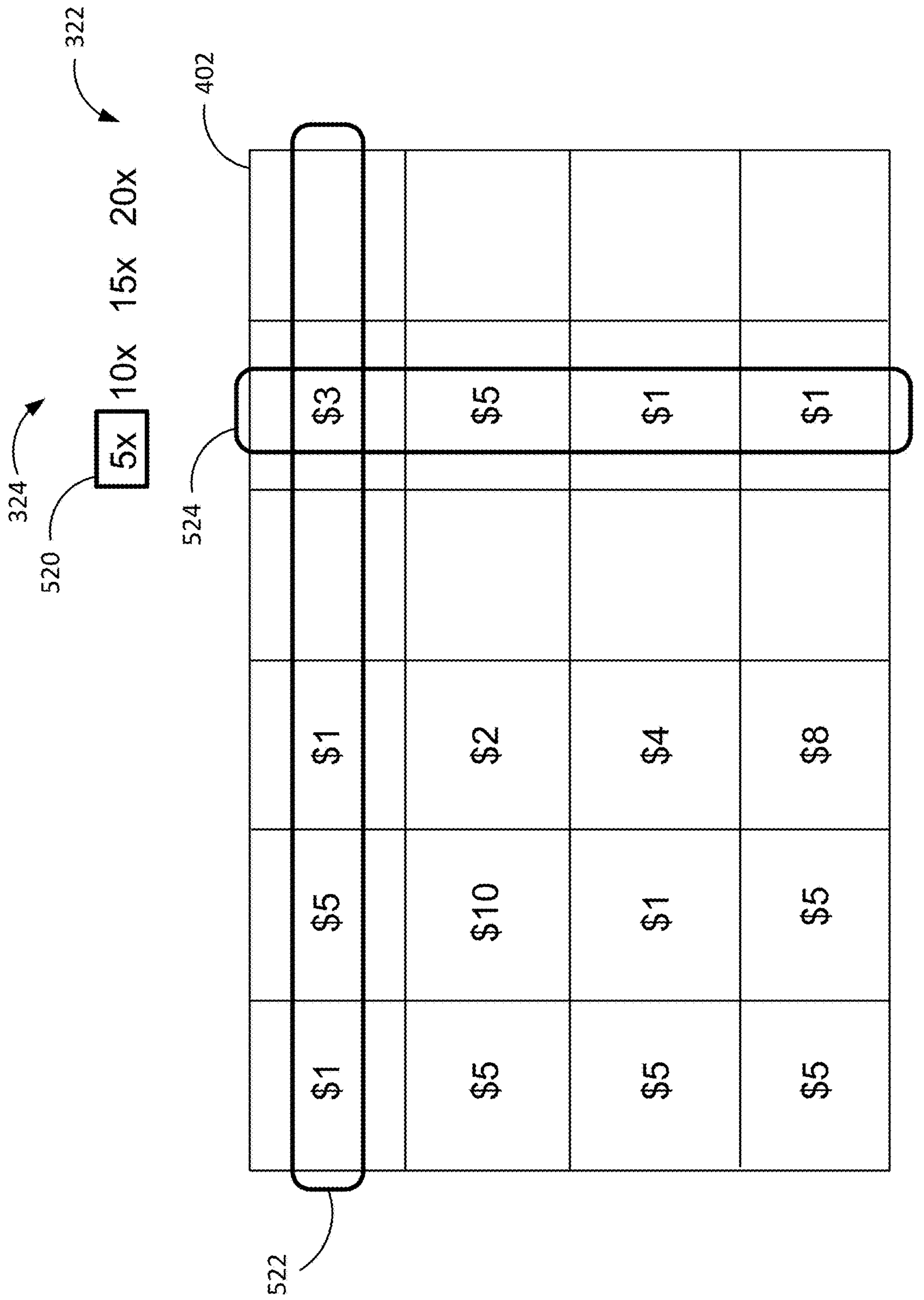

FIG. 5C depicts results of a second round of play. The spots of columns "4" and "6" are illustrated here as blank because they were awarded in the first round and are no longer eligible to win in later rounds. Further, the set of award multipliers 324 has been updated to remove "4×" (having already been awarded) and now highlights the applicable award multiplier 520 (e.g., "5×") for the second round. In the example embodiment, the multiplayer gaming server 250 selects a row 522 (e.g., row "A") and a column 524 (e.g., column "5") of the matrix 402 to award in the second round. Similarly, the multiplayer gaming server 250 multiplies the base value of each spot by the award multiplier 520 to determine an award value for that spot, and may display the award multiplier 520 or the computed award value in each of the spots. In some embodiments, one or more spots may be intersected by the selected row(s) and column(s). In such embodiments, the intersection spot may be paid multiple times (e.g., twice, once for each winning row or column), the intersection spot may be deferred from this round (e.g., a "safe zone," remaining active to win in subsequent game rounds), or the intersection spot may be paid once or twice for this round and remain active to win again in subsequent game rounds. For example, spot "A5" may be paid twice at 5× since spot "A5" was selected both by row 522 and by column 524. In some embodiments, spot "A5" may be "saved" to continue on to the next round(s) and claim a higher multiplier instead. Once the second round is completed, the multiplayer gaming server 250 depicts the awarded spots in row 522 and column 524 as having been awarded and marks each associated entry as having been awarded.

In some embodiments, the multiplayer gaming server 250 may provide a super bonus award during one or more rounds of play. For example, the multiplayer gaming server 250 may randomly identify a bonus position within the moving highlighted rows or columns (e.g., second position from the left, third position from the top). As the highlighting rows/columns move during the game choreography of a particular round, the bonus position is highlighted within that row within the choreography. When the animation stops, the winning spot located at that bonus position of the highlighted row is additionally awarded the super bonus award. The super bonus award may be, for example, an additional multiplier (e.g., 2×, 3×), an additional cash award (e.g., 500 credits, $10), or such. In some embodiments, each of the moving highlighted rows/columns may include a bonus position. In some embodiments, the bonus position within a particular highlighted row may move (e.g., one space) or be randomly reassigned with each incremental movement of the highlighted row.

Figure 5D:
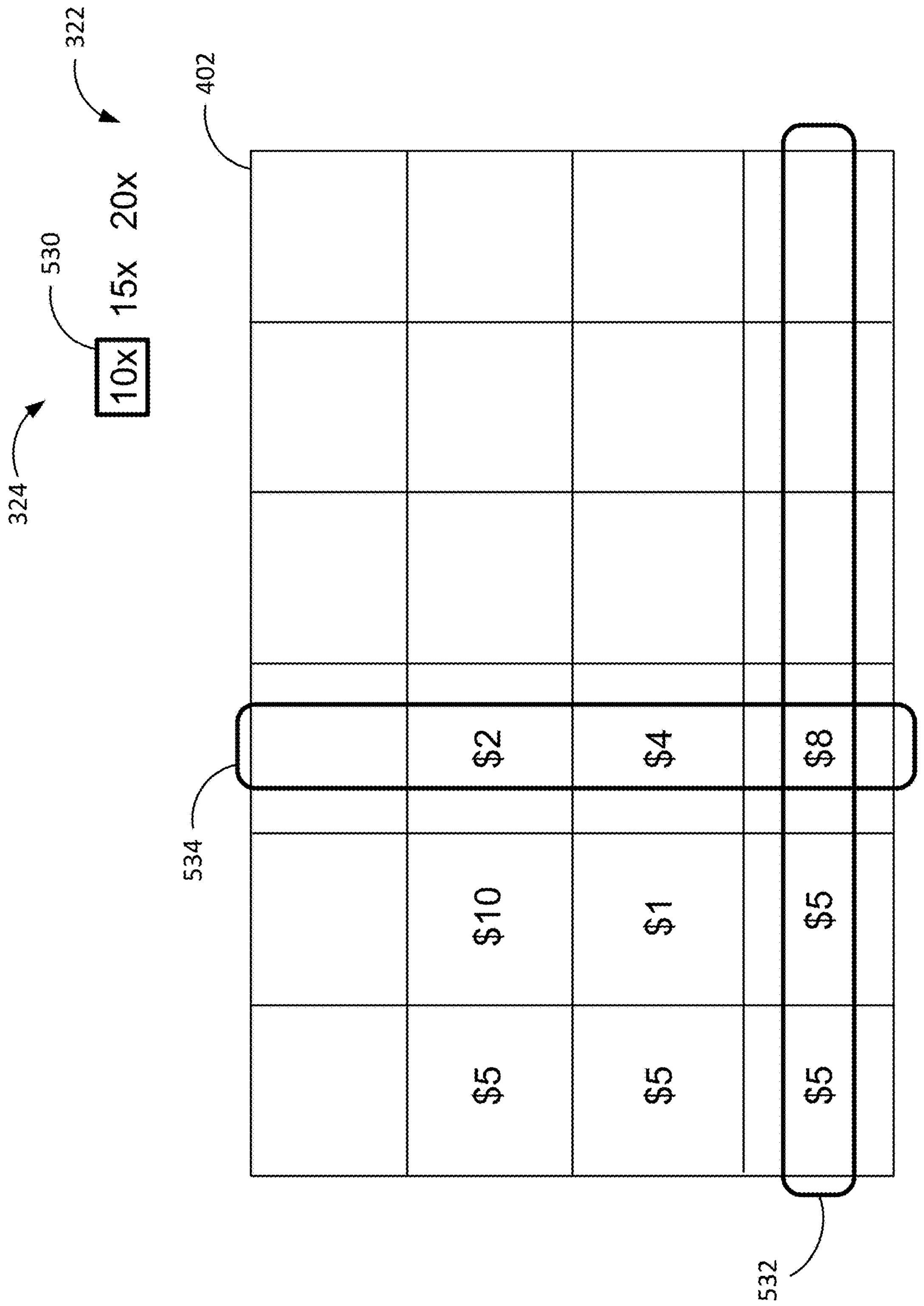

FIG. 5D depicts results of a third round of play. The spots of row "A" and column "5" are illustrated here as blank because they were awarded in the second round and are no longer eligible to win in later rounds. Further, the set of award multipliers 324 has been updated to remove "5×" (having already been awarded) and now highlights the applicable award multiplier 530 (e.g., "10×") for the third round. In the example embodiment, the multiplayer gaming server 250 selects a row 532 (e.g., row "D") and a column 534 (e.g., column "3") of the matrix 402 to award in the third round. The multiplayer gaming server 250 multiplies the base value of each spot by the award multiplier 530 to determine an award value for that spot, and may display the award multiplier 530 or the computed award value in each of the spots. Spot "D3" may be paid twice at 10× since spot "D3" was selected both by row 532 and by column 534. In some embodiments, spot "D3" may be "saved" to continue on to the next round(s) and claim a higher multiplier instead. Once the third round is completed, the multiplayer gaming server 250 depicts the awarded spots in row 532 and column 534 as having been awarded and marks each associated entry as having been awarded.

Figure 5E:
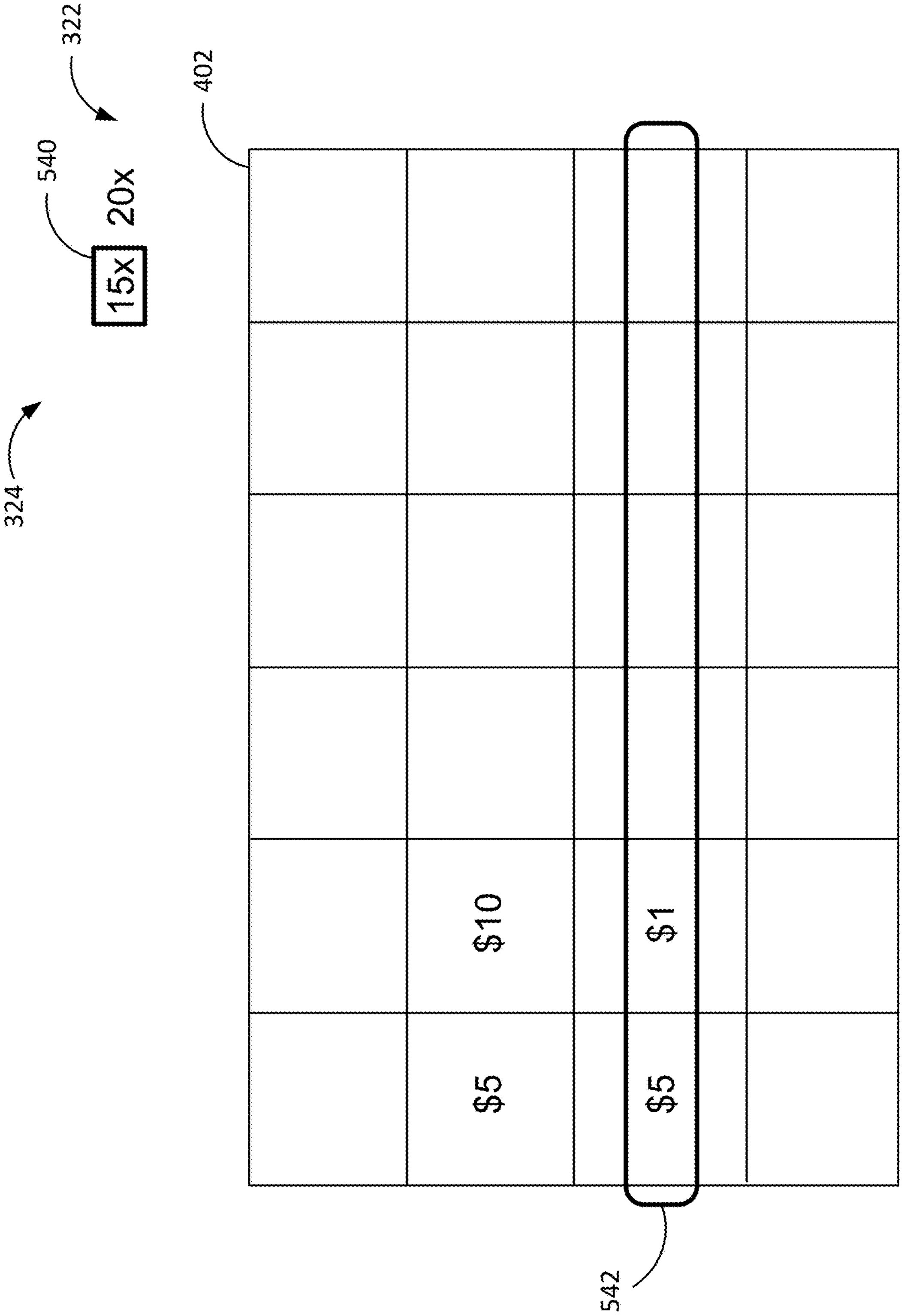

FIG. 5E depicts results of a fourth round of play. The spots of row "D" and column "3" are illustrated here as blank because they were awarded in the third round and are no longer eligible to win in later rounds. Further, the set of award multipliers 324 has been updated to remove "10×" (having already been awarded) and now highlights the applicable award multiplier 540 (e.g., "15×") for the fourth round. In the example embodiment, the multiplayer gaming server 250 selects a row 542 (e.g., row "C") of the matrix 402 to award in the fourth round. The multiplayer gaming server 250 multiplies the base value of each spot by the award multiplier 540 to determine an award value for that spot, and may display the award multiplier 540 or the computed award value in each of the spots. Once the fourth round is completed, the multiplayer gaming server 250 depicts the awarded spots in row 542 as having been awarded and marks each associated entry as having been awarded.

Figure 5F:
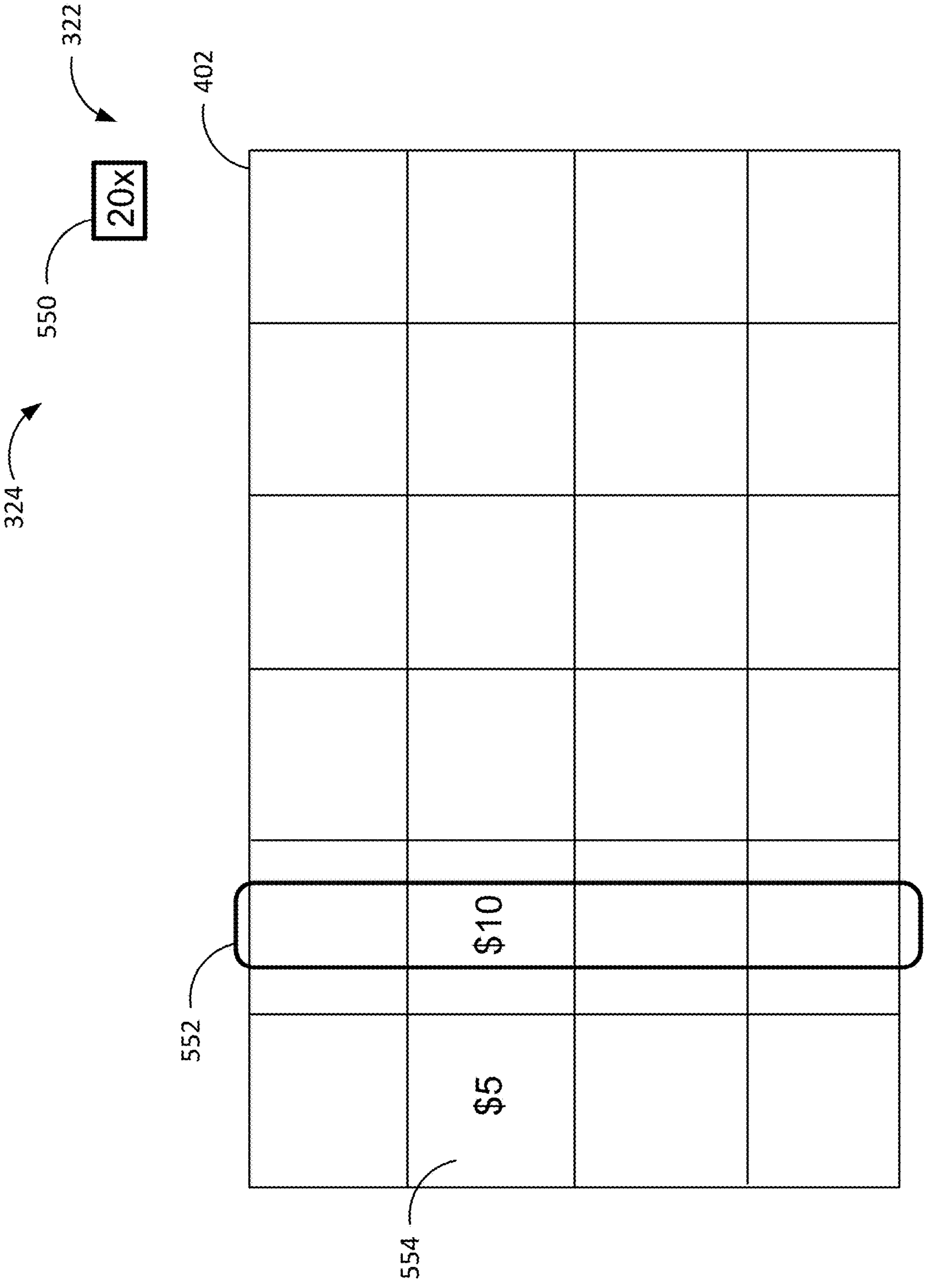

FIG. 5F depicts results of a fifth and final round of play of the communal game cycle. The spots of row "C" are illustrated here as blank because they were awarded in the fourth round and are no longer eligible to win in later rounds. Further, the set of award multipliers 324 has been updated to remove "15×" (having already been awarded) and now highlights the applicable award multiplier 550 (e.g., "20×") for the fifth round. In the example embodiment, the multiplayer gaming server 250 selects a column 552 (e.g., column "2") of the matrix 402 to award in the fifth round. The multiplayer gaming server 250 multiplies the base value of each spot by the award multiplier 550 to determine an award value for that spot, and may display the award multiplier 550 or the computed award value in each of the spots.

In this example, once the fifth round is completed, the multiplayer gaming server 250 depicts the awarded spots in row 542 as having been awarded. One or more remaining spots 554 may be as yet unawarded. In the example embodiment, any remaining spots 554 that have not been awarded after the last round of play are awarded with a "top award" of a fixed dollar amount (e.g., $100). In other embodiments, remaining spots 554 may be awarded with a variable dollar amount (e.g., based on an amount of funds remaining in the pool), a jackpot prize amount (e.g., presented and marketed by an operator), merchandise, or other comps. In the example embodiment shown in FIG. 5G, any remaining spot(s) 554 may be awarded a spin of the award wheel 326 (e.g., winning from a list of potential prizes, such as various multipliers, fixed dollar amounts, merchandise, or such, each included as a space on the wheel). In the example shown in FIG. 5G, various multipliers may be awarded to the remaining spot(s) 554 (e.g., from 25× to 1000×). In some embodiments, one or more award wheel spaces may be configured to include a premium award (e.g., a premium award provided for an event, such as in the hockey jersey example above). The multiplayer gaming server 250 simulates a spin of the wheel 326, stopping the wheel 326 on one of the award wheel spaces, and awards the associated award to the spot 554. In some embodiments, the multiplayer gaming server 250 may allow the player 302 to initiate the spin via their gaming device 304. For example, the multiplayer gaming server 250 may transmit a wheel spin message to the gaming device 304 associated with the winning spot. The gaming device 304 may display the wheel 326 and allow the player 302 to initiate the spin (e.g., via pressing a physical or virtual button on the button deck or a touchscreen display), and the multiplayer gaming server 250 may cause the wheel 326 to spin and display the result on both the display 320 and on the gaming device 304 of the player(s) 302.

The various communal games and systems described herein provide an enhanced gaming experience for the participating players. Support for differing primary game devices (e.g., stand-up, bar top, mobile), different game types (e.g., slots, video poker, video keno), and different currencies (e.g., real money, loyalty points, soft currencies) allows players to experience a supplemental gaming experience in a multi-player environment while continuing to experience their own solo primary game play on a familiar game. The communal display provides visual indication of players participating in the communal game, leading to an increased social experience that may be preferred or enjoyable to many different types of people. These systems also allow for tournament and special event features in which many players can jointly participate. Players are less likely to leave the gaming devices because they are playing a primary game they enjoy while potentially qualifying for communal game play and the additional experiences that communal game play provides. These effects lead to at least the technical benefits of increased machine use of the gaming devices, which provides efficiencies in energy usage (e.g., where unused but operational machines represent waste).

Figure 6:
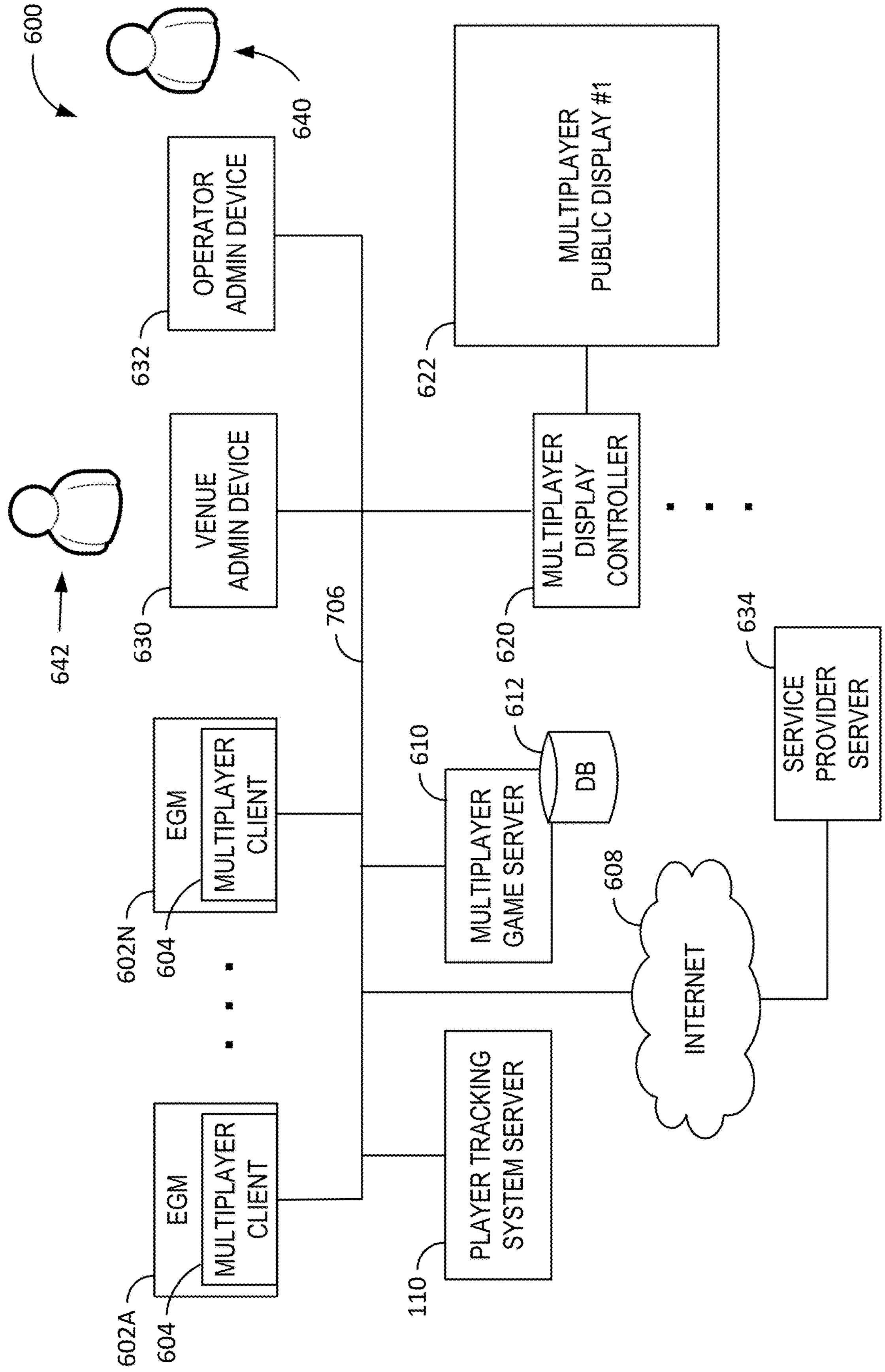
FIG. 6 is an example networked environment of a multiplayer game architecture configured to provide multiplayer game services for wagering games.

FIG. 6 is an example networked environment 600 of a multiplayer game architecture configured to provide multiplayer game services for wagering games such as EGMs 602. In some embodiments, the networked environment 600 may be similar to the networked environment 301 (shown in FIG. 3). In the example environment, the networked environment 600 includes the EGMs 602A-602N (collectively, "EGMs 602"), which may be similar to gaming devices 304 (shown in FIG. 3). Each EGM 602 includes a multiplayer client 604. Multiplayer gaming services are provided to the EGMs 602 by a multiplayer game server 610, which may be similar to the multiplayer gaming server 250 (shown in FIG. 2 and FIG. 3), and vice versa. The multiplayer game server 610 stores game data (e.g., communal game configuration data, game play data for game cycles, or such) in a game administration database (or just "game admin DB") 612, which may be similar to communal game database 252 (shown in FIG. 2). The multiplayer game server 610 provides multiplayer game data that is displayed on a multiplayer public display ("MP display #1") 622 by an multiplayer display controller 620, which may be similar to the communal game display 320 (shown in FIG. 3), controlled by an multiplayer display controller 720.

In some embodiments, devices 602 may include smart table games (e.g., particular seats or positions at a smart table, not shown), bar top EGMs 404A (e.g., gaming devices 104X), upright EGMs 404B (e.g., gaming devices 104, 200), or mobile devices 404C (e.g., smart phones, tablet computers supporting social or wagering games via a player app). Participation in multiplayer games may be provided across disparate types of devices or types of primary games (e.g., based on triggering events configured specifically for the particular primary game type). The multiplayer display controller 620 is configured to present multiplayer game data on the multiplayer public display 622, allowing nearby players 302 and spectators 306 to witness participation and game play of the multiplayer game. In communal games, players 302 may win participation in a communal game based on trigger conditions occurring within their primary game (and possibly based on whether they elect to provide an additional wager), and the multiplayer public display 622 may display a shared play area (e.g., play area 322). In tournament games, players 302 may buy into or be awarded participation into a multiplayer, tournament-formatted game (e.g., a particular primary slot game played for a fixed period of time or for a fixed number of spins), and the multiplayer public display 622 may display a current leader board or big win results for particular individual spin outcomes, visual representation of rank (e.g., via buffalo race, on overhead signage or EGM top screen), separate tournament leader boards on portrait screens, countdowns and timers, feature announcements or displays, plus other displays and overlays on toppers and EGM top and bottom screens, including a tournament user interface.

In the example embodiment, the multiplayer game architecture provides multiple administrative ("admin") devices, such as an operator admin device 632 and one or more venue admin devices 630. The admin devices 630, 632 may be used by the operator to configure, administer, track, and audit aspects of the multiplayer game play experience provided by the multiplayer game server 610. The example multiplayer game architecture provides a tiered administrative architecture that provides an operator (e.g., casino manager or administrative personnel, bar manager) a set of administrative privileges ("operator privileges" of an "operator tier") to view and configure aspects of the multiplayer game play experience offered by the multiplayer game server 610 while also allowing the operator to delegate certain privileges ("venue privileges" of a "venue tier") to one or more venue personnel 642 (e.g., floor managers, bar tenders, waiters). The operator admin device 632 (e.g., a desktop computing device) may provide a dashboard interface ("operator dashboard," not shown) that allows the operator 640 to configure the multiplayer game server 610 and to delegate privileges to venue personnel 642. The venue admin device(s) 630 may be computing devices (e.g., desktop device, mounted tablet device, mobile device) that are deployed at a venue for easy access by venue personnel 642 within the venue of an multiplayer game (e.g., within a lounge, near a bank of participating devices 602). Since the venue personnel 642 may have a contemporaneous, on site appreciation for the people currently at the venue, such a tiered structure may allow venue personnel 642 to "read the room" and make spontaneous decisions about multiplayer game play at the venue (e.g., what the currently present players prefer to play, what multiplayer game may energize the room, what sporting event is currently exciting the players that can be enhanced by a particular multiplayer game experience, to influence player behavior through offers or opportunities related to the player's current physical location, play experiences, preferences, and so forth).

In the example embodiment, the operator dashboard provides various functionalities to the operator 640. For example, categories of operator privileges include game configuration privileges, accounting privileges, and device configuration privileges. These various privileges are described in greater detail below. Further, the operator dashboard may allow any or all of the various operator privileges to be delegated or additionally permissioned to one or more venue personnel 642 or venue admin devices 630.

Game configuration privileges, in the example embodiment, include game play scheduling (e.g., which multiplayer game(s) will be hosted by the multiplayer game server 610 and timing of such games, timing of premium awards availability, how many multiplayer games are active), game play awards (e.g., adding marketing funds to a prize pool for an multiplayer game or for premium awards, configuring prize pool requirements for participation, adding non-monetary awards such as premium awards to prize pools for an multiplayer game), participation requirements (e.g., require loyalty award member or minimum level, minimum amount of session play or wager amount)), marketing configurations (e.g., configuring display parameters for a message bar presented on the communal game displays 320 or on participating EGMs 304, configuring text or images appearing on spots of Ca$h Wall, configuring wall promotions or advertisements appearing on the communal game displays 320 or on participating EGMs 304), game play rules (e.g., configuring appearance timing of premium awards, icons to pick for premium awards, configuring game event parameters), and tournament administration (e.g., tournament registration identifying which players or devices will participate, thresholds for participation, creating, managing, stopping and starting tournaments, host controls for tournament announcements, seating assignments).

Device configuration privileges, in the example embodiment, include device enablement (e.g., installing or otherwise enabling multiplayer clients 604 on particular EGMs 602, installing particular multiplayer game components on particular EGMs 602), configuring display control (e.g., which multiplayer displays 622 are assigned to the multiplayer game server 610, how the multiplayer displays 622 may be used or reassigned during game play, what customized messages, artwork or logos appear on the multiplayer displays 622), server-to-server connectivity (e.g., connecting the multiplayer game server 610 with other multiplayer game servers for multiplayer game sharing across more gaming devices, venues, or properties), mobile settings (e.g., whether mobile participation is allowed, tethering requirements, white/black listing of particular mobile devices), and venue admin configuration (e.g., registration of particular venue admin devices 630, operator privilege delegation to particular venue personnel 642 or particular venue admin devices 630).

Accounting privileges, in the example embodiment, include game play viewing (e.g., show all players at participating devices, all players currently on play area, vacated player data, game play display), game result viewing (e.g., show game play statistics, award amounts and totals, pool contributions and totals, participation rates and levels, vacated and divested player data, credit transfer for communal wins, calculations for multiplier awards), player proximity viewing (e.g., who is or was near the venue, who has left the venue), and administrative actions auditing (e.g., view game play configuration changes by venue personnel 642).

In one example embodiment, multiplayer game services may be provided by a service provider server 634 of a third-party provider ("service provider"). For example, the service provider may administer various multiplayer game services for various venues or operators (e.g., as a service, for an ongoing fee, or such). The service provider server 634 may perform as the multiplayer game server 610 for administration and control of the various multiplayer games provided at various venues. As such, the service provider server 634 may similarly communicate with EGMs 602 (e.g., receiving events triggering participation in the multiplayer games, transmitting game play data for the multiplayer games to the EGMs 602 for local display) and multiplayer display controllers 620 (e.g., for displaying Multiplayer game play data on the multiplayer public displays 622). The service provider server 634 may provide configuration access to operators 640 via the operator admin device 632, venue admin device 630, or another computing device (e.g., via an API interface), thereby allowing operators or venue personnel 642 to similarly administer aspects of the multiplayer games. The service provider server 634 may similarly administer a game play database similar to game play database 612. In some embodiments, the multiplayer system architecture may provide a third tier of administrative control in which the administration privileges are permissioned to the service provider and the service provider delegates a subset of administrative privileges to the operator. As such, the service provider may facilitate easier administration of the multiplayer games for the operators 640, who may prefer a low maintenance offering. Further, the service provider may retain certain privileges, such as control over how the multiplayer public displays 622 are used during operation.

In some embodiments, and as mentioned above, one or more of the EGMs 602 may additionally or alternatively execute an multiplayer server component (not shown) configured to provide multiplayer game services similar to the multiplayer game server 610. For example, EGM 602A may additionally run the multiplayer server component, generate the multiplayer game database 612, and communicate with other EGMs 602B-N to administer one or more multiplayer games.

In the example embodiment, the multiplayer game server 610 administers or otherwise manages one or more prize pools for the multiplayer games being performed by the multiplayer game server 610. A prize pool is a pool of funds from which awards are given during play of the multiplayer games. A prize pool may be created for each game cycle of a particular game or game instance, or for each type of game, or for each operator or venue. Prize pools may include currency (e.g., dollars (USD, AUD), euros, yen), loyalty points, or other non-currency prizes such as comps (e.g., free drinks, free plays, free services), merchandise (e.g., shirts, jerseys, mugs), or digital content (e.g., additional avatar selections, avatar outfits, background colors or graphics, mobile games). The prize pool may receive deposits from the operator 640 (e.g., marketing funds to increase player enthusiasm, entries added for various non-currency prizes, prizes provided by third-party advertisers), from EGMs 602 (e.g., supplemental wager amounts submitted by the players 302 to participate in the multiplayer game, wager portions of primary wagers submitted by the players 302 during primary game play), or directly from players 302 (e.g., purchasing participation in a tournament).

In an example embodiment, a prize pool is created for each game instance (e.g., when instantiating the game instance on the multiplayer game server 610). The operator 640 may seed the prize pool with funds and prizes. In some situations, the EGMs 602 may be configured to accept supplemental wagers for participation in the multiplayer game, and those supplemental wagers may be transmitted (e.g., by the multiplayer client 604) to the multiplayer game server 610 as deposits into the appropriate prize pool. The multiplayer game server 610 tracks these deposits in the multiplayer game database 612 for each prize pool.

Each multiplayer game instance being provided by the multiplayer game server 610 may have an associated prize pool, each with a unique prize pool ID. During multiplayer game play, the prize pool attached to a particular multiplayer game instance is used to fund awards provided by the multiplayer game in one or more cycles of play. For example, a Ca$h Wall game instance provided by the multiplayer game server 610 may have a first prize pool and a tournament slot game instance provided by the multiplayer game server 610 may have a second prize pool. The first prize pool may receive incremental deposits from EGMs during primary game play, seeding the first prize pool with funds as participating players play their primary games. The second prize pool may receive registration entry payments from players wishing to register in the tournament, or may receive marketing dollars from an operator or other sponsor to provide a "free" tournament. As game play for the multiplayer game rounds are resolved, awards from the Ca$h Wall game play are satisfied from the first prize pool and awards from the slot tournament are satisfied from the second prize pool. In some embodiments, if the amount of funding in the prize pool for a particular multiplayer game cycle is insufficient to cover all of the awards, the multiplayer game server 610 may be configured to automatically transfer a balance amount from a preconfigured account to cover the shortfall. Awards may be transferred from the prize pool to the winning EGM 602 (e.g., for players still present at their winning EGM 602, as credit to their current total) or to a house account of the winning player (e.g., for known loyalty players). For players who prematurely divest from a vested multiplayer game interest, the win may be forfeited and those funds may remain in the prize pool for use in a later communal game cycle, or the player may receive their bet value, 4× their bet value, or an average expected value, with any remainder contributing to the prize pool.

In some embodiments, the multiplayer game server 610 may automatically activate one or more multiplayer game play features for a particular cycle of play. For example, the multiplayer game server 610 may be configured to activate a special hidden reward spot feature on Ca$h Wall when multiplayer game participation exceeds a predetermined threshold or when participation award rate exceeds a predetermined threshold (e.g., when there is a big crowd participating in the multiplayer game instance), or when the prize pool exceeds a predetermined threshold (e.g., when there are enough funds to cover the multiplayer game play feature).

In the example embodiment, the multiplayer client 604 on the EGMs 602 provides display functionality for multiplayer game play. For example, the multiplayer client 604 may provide a toggle button that, upon activation, displays current status or game play of the multiplayer game (e.g., as a full display overlaying the primary game, as a proportioned display allowing the player to continue playing their primary game, as a thumbnail image). In some embodiments, the multiplayer client 604 provides a cash out button or divest button configured to allow the player to divest from their vested multiplayer game interest (e.g., vacating their participation, cashing out at a minor value).

In some embodiments, the EGM 602 may include a lighting package (e.g., edge lighting) that is activated by the multiplayer client 604 or the multiplayer game server 610 in conjunction with multiplayer game play. For example, in one embodiment, edge lighting may light up whenever a particular EGM 602 is awarded participation in the multiplayer game or wins an award in the multiplayer game cycle, or may otherwise be responsive to what is being displayed on the multiplayer display, or may be responsive to player input. For example, the player could touch their avatar or a designated button on the EGM 602 to cause an animation of their avatar on the multiplayer display (e.g., make the avatar clap, cheer, tip hat, blow a kiss, or other avatar gesture) and the multiplayer display edge lighting may display the active avatar's color or a specific pattern. In some embodiments, players may purchase (e.g., with loyalty points) or be awarded (e.g., through communal game play) additional player gestures that may be unlocked and subsequently used during later communal game play. As such, nearby players can see which players win in each game cycle or round, thereby increasing social interaction and excitement. In one embodiment, edge lighting may flicker in conjunction with a selector passing over the player's vested spots on the Ca$h Wall, thereby increasing excitement and anticipation as the selector(s) slow to reveal the winning spots.

In some embodiments, the multiplayer game server 610 may administer a "lucky seat" multiplayer game that may leverage the lighting packages on EGMs 602. For example, a lucky seat game may be enabled during a particular sporting event (e.g., while a hockey game for a home team is being shown at the gaming venue). The multiplayer game server 610 identifies one or more EGMs 602 as the lucky seat for a window of time (e.g., a 2-minute window, a 5-minute window) and activates the lighting package of that lucky seat EGM 602 during the window (allowing nearby players and spectators to know who is in the lucky seat). In some embodiments, the lucky seat window may be activated by a spot win on the local EGM 602. In some embodiments, the lucky seat window may be randomly awarded by identifying one or more EGMs 602 from a pool of participating EGMs 602. The lucky seat event may be configured to award the player at the lucky seat EGM 602 a particular award (e.g., a hockey jersey, a bonus cash award, or other premium award) whenever the home team scores. In some embodiments, the multiplayer game server 610 receives indication of a lucky seat award event manually from an operator (e.g., a bartender initiates the lucky seat award when they notice the home team score). In other embodiments, the multiplayer game server 610 is configured to receive a message from a third-party service provider identifying when a particular team scores in a particular game.

In the example embodiment, when the lucky seat is awarded, the multiplayer game server 610 causes the lighting package of the lucky seat EGM 602 to flash or otherwise provide a lighting or audio presentation to indicate winning of the lucky seat award. The multiplayer game server 610 rotates the lucky seat to another EGM 602 whenever the lucky seat award is achieved or periodically based on expiration of the lucky seat window. As such, the multiplayer game server 610 provides a rotating win potential tied to a sporting event for the participating EGMs 602. In some embodiments, other award events may be configured to occur. For example, positive award events may include the home team scoring (e.g., as in baseball, football, hockey, soccer), the home team getting a hit (e.g., as in baseball) or a first down (e.g., as in football), or the achievement of some other type of positive event (e.g., a favorite tennis player winning a match, any golfer in a tournament hitting a double-bogey or better, a home athlete winning an Olympic race, or such). In some embodiments, negative award events may be configured, such as the opposing team taking a penalty (e.g., as in hockey), committing an error (e.g., as in baseball), getting sacked (e.g., as in football), or such. The multiplayer game server 610 may allow operators to configure aspects of such lucky seat games, including the subject event (e.g., game, tournament), which participating team(s) or individual athletes are the positive or negative subjects of the game, which events are to be awarded, the nature of the lucky seat awards (e.g., cash, premium awards, or such), and such. In some embodiments, the lucky seat game may be combined with another communal game such as Ca$h Wall, allowing lucky seat awards to be provided within the communal game. For example, if a lucky seat player achieves a lucky seat award while they have one or more vested spots on a Ca$h Wall, the lucky seat award may be an additional multiplier to one or more of their vested spots.

In some embodiments, the networked environment 600 may include multiple multiplayer display controllers 620 and multiple multiplayer displays 622. In one embodiment, the multiplayer game server 610 may cause one multiplayer display controller 620 and associated multiplayer display 622 to display a current cycle of a Ca$h Wall instance and a second multiplayer display controller and multiplayer display (not separately shown) to display the next cycle of the same Ca$h Wall instance. For example, when the current cycle of the Ca$h Wall instance fills up and begins game play for that cycle, the multiplayer game server 610 may begin spot assignment for the next cycle of that Ca$h Wall instance and may display that next cycle of Ca$h Wall on the second multiplayer display. As such, players that are vested in the current cycle can view the game play on the first multiplayer display 622, while players that become vested in the next cycle (e.g., after the current cycle Ca$h Wall has filled) can view their participation on the second multiplayer display. In some embodiments, once the current cycle is finished and concluded, the first multiplayer display 622 may continue to display the final results of that previous cycle until the now-current cycle becomes full, causing the first multiplayer display 622 to thereby start showing the next cycle. As such, players may always see status of multiple cycles of play.

Figure 7:
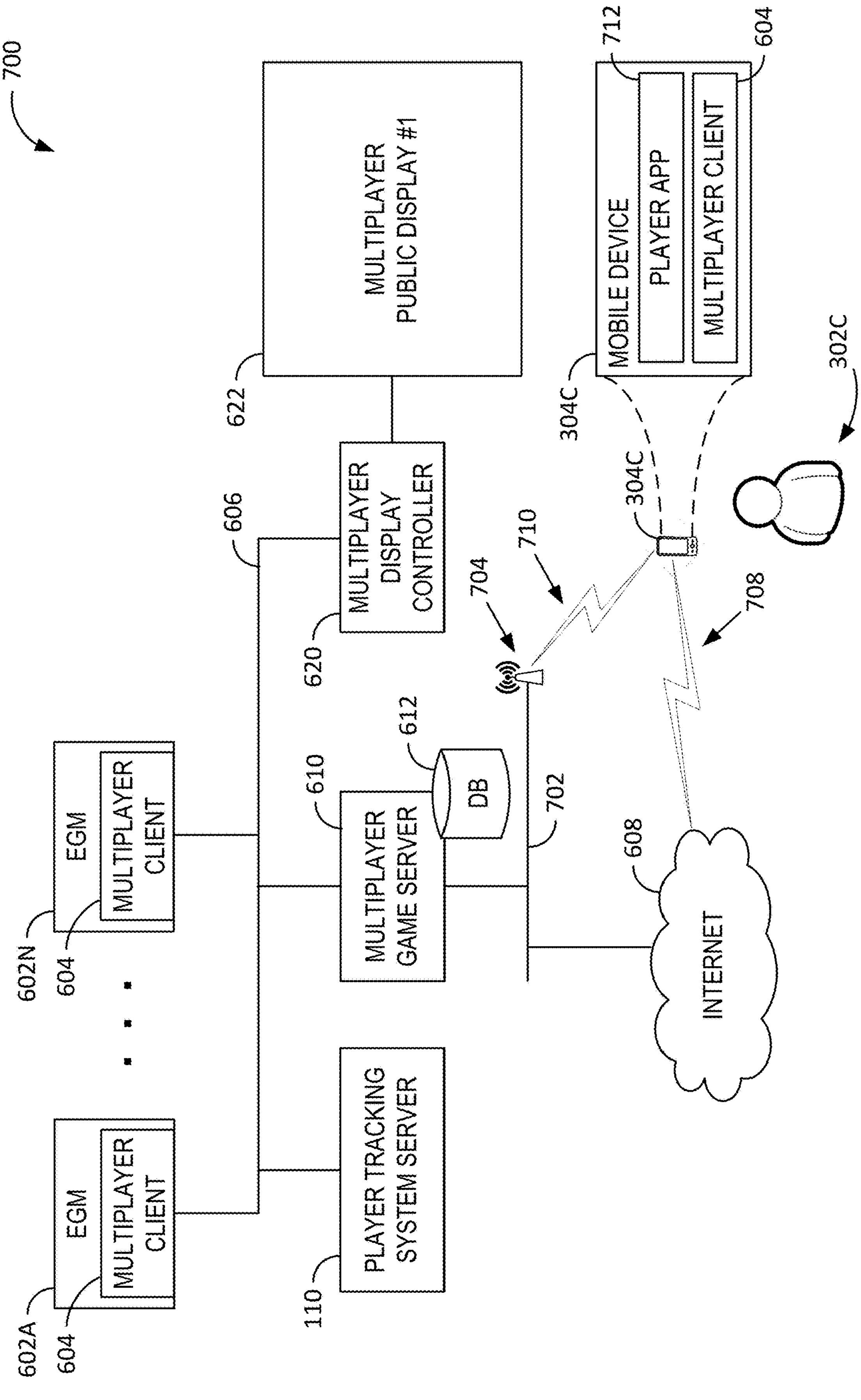
FIG. 7 is another example networked environment of the multiplayer game architecture configured to additionally provide multiplayer game services for mobile devices of mobile players.

FIG. 7 is another example networked environment 700 of the multiplayer game architecture configured to additionally provide multiplayer game services for mobile devices 304C of mobile players 302C. In some embodiments, aspects of the networked environment are similar to the networked environment 600 (shown in FIG. 6). In the example embodiment, the mobile player 302C installs a player app 712 on the mobile device 304C. The player app 712 allows the mobile player 302C to participate in mobile gaming (e.g., electronic wagering games, social games) via their mobile device 304C. The player app 712 also includes the multiplayer client 604 which allows participation in multiplayer games as described herein. In some embodiments, players 302C may get updates, instant prizes, or push notifications related to a tournament. In some embodiments, players 302C may participate in tournament games via their mobile device 304C. In some embodiments, players 302C can use their mobile devices 304C to purchase a spot on the communal game or play keno at a table away from the venue to earn a spot on the communal game.

In some situations, mobile players 302C may be required to be at a particular location ("tethered location," e.g., on a casino property, within a pre-determined distance of a bar) in order to participate in mobile gaming or the multiplayer games through the player app 712. In one embodiment, the multiplayer game architecture ensures proximity to the tethered location via wireless connectivity of the mobile device 304C. For example, when the mobile player 304C wishes to participate in the multiplayer games, the mobile device 304C may transmit a participation request to the multiplayer game server 610 over a wireless connection 708 (e.g., the Internet 608, a cellular network) that is not local to the tethered location. The multiplayer game server 610 identifies an external IP address of the requesting device and refuses participation for the mobile device 304C. In the example embodiment, the refusal may prompt the mobile device 304C to scan for local wireless (e.g., WiFi, Bluetooth) networks or beacons, such as beacon 704. The multiplayer game server 610 may provide a list of acceptable beacons 704 (e.g., beacons 704 on a local network 702) to the mobile device 304C. Upon discovering the beacon 704 and determining acceptability, the mobile device 304C establishes a wireless connection 710 to the beacon 704 and requests connection to the multiplayer game server 610 and the multiplayer games through that local connection 710. The multiplayer game server 610 determines that the traffic from the mobile device 304C through the wireless connection 710 has a local IP address (e.g., on a known subnet) and allows the multiplayer game play.

In some embodiments, the multiplayer game server 610 captures GPS location data from the mobile device 304C and automatically determines whether the mobile device 304C is at a particular venue, within a particular premise perimeter (e.g., based on geofencing of a wagering location), or within a predetermined distance of a predefined GPS location (e.g., a center of a casino property or wagering location). In some embodiments, the multiplayer game server 610 may use IP addresses or subnets, or network connectivity to local networks to determine whether the mobile device 304C is at a particular venue.

In some embodiments, the multiplayer game architecture provides ongoing tethering for mobile devices 304C participating in wagering games or multiplayer games. For example, in the WiFi embodiment described above, if the mobile device 304C loses connection to the beacon 704, then the player app 712 or the multiplayer game server 610 may refuse participation (e.g., even if communication is coming through network connection 708). In GPS embodiments, the multiplayer game server 610 may periodically recheck the location of the mobile device 304C based on updated GPS information from the mobile device 304C and discontinue participation if the mobile device 304C is out of bounds.

Figure 8:
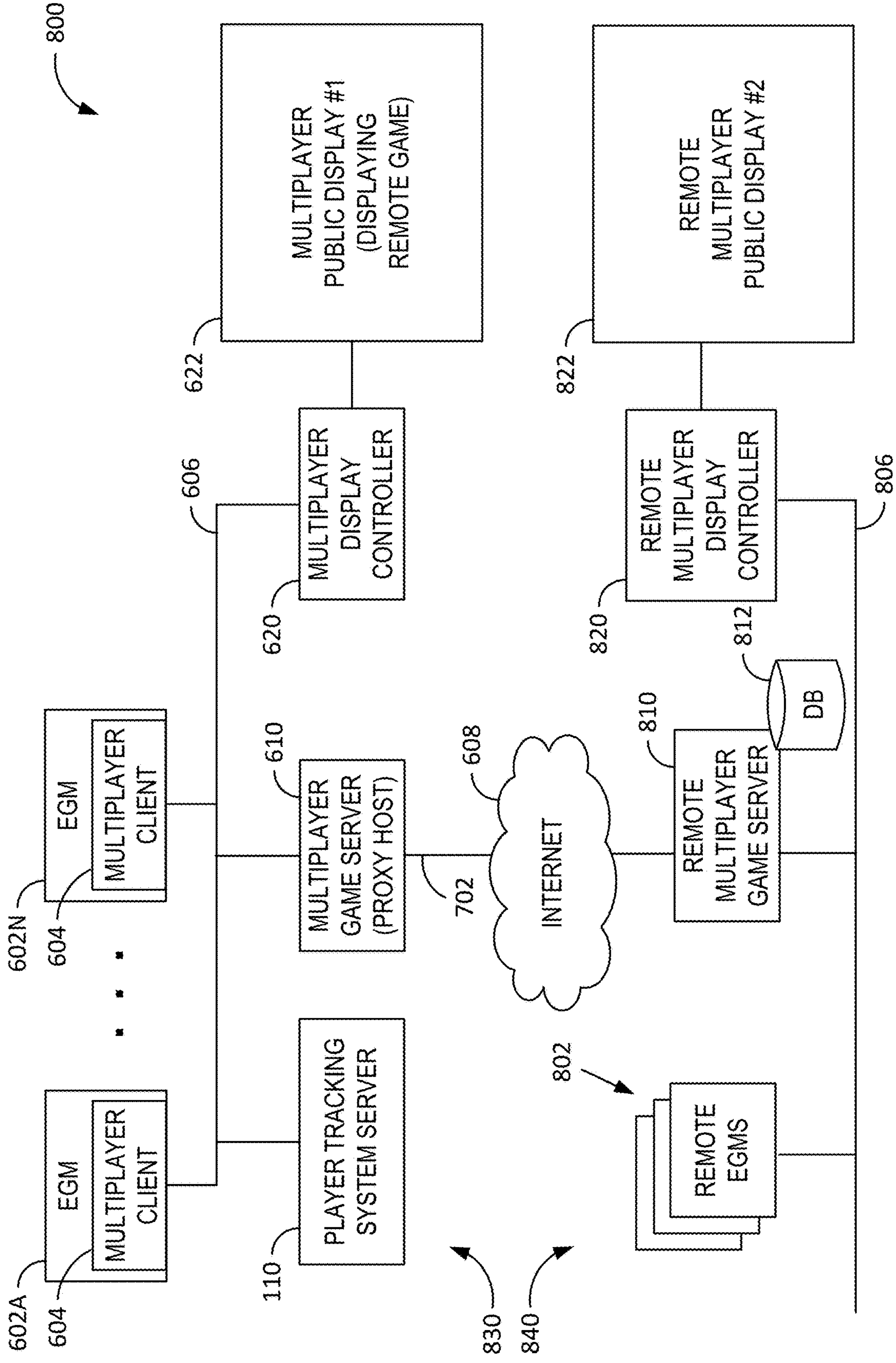
FIG. 8 is another example networked environment of the multiplayer game architecture configured to provide multiplayer games across multiple sites.

FIG. 8 is another example networked environment 800 of the multiplayer game architecture configured to provide multiplayer games across multiple sites 830, 840. In some embodiments, the networked environment 800 may be similar to the networked environments 600, 700. In the example embodiment, participation in an multiplayer game is provided to players of the EGMs 602 at a first site 830 as well as players of remote EGMs 802 at a second site ("remote site") 840. In other words, EGMs 602, 802 are all devices participating in the same multiplayer game. It should be understood that the remote site 840 is referred to in this example as remote relative to the first site 830 for purposes of illustrating aspects of the multiplayer game architecture. In some embodiments, each site 830, 840 is considered a separate, distinct site when supported by a separate multiplayer game server 610, 810. Remote EGMs 802 may be similar to EGMs 104, 602 or gaming device 200. In this example, the remote site 840 includes a remote multiplayer game server 810 and a multiplayer game database 812, which may be similar to multiplayer game server 610 and multiplayer game database 612, respectively. Further, the remote site 840 also includes a remote multiplayer display controller 820 and remote multiplayer public display #2 822, which may be similar to the multiplayer display controller 620 and multiplayer public display #1 622. During game play, game play data for the multiplayer game may be displayed at both sites 830, 840 on multiplayer displays 622, 822.

In the example embodiment, the remote multiplayer game server 810 is hosting a multiplayer game that is being made available to multiple sites (e.g., sites 830, 840). As such, the remote multiplayer game server 810 is referred to herein as the "primary host" of the multiplayer game. The remote multiplayer game server 810 provides access to the multiplayer game for remote EGMs 802 directly (e.g., over a network 806). The multiplayer game server 610 at the first site 830 facilitates participation in the multiplayer game for EGMs 602 or other gaming devices at the first site 830 (e.g., on network 606), acting as a "secondary host" of the multiplayer game for EGMs 602. In some embodiments, the EGMs 602 may directly communicate with the remote multiplayer game server 810 for participation in multi-site communal games. In the example architecture shown in FIG. 8, the use of the multiplayer game server 610 acting as a proxy for the EGMs 602 may serve to reduce network latency for multi-site games.

In one embodiment, referred to herein as "proxy hosting," the multiplayer game server 610 acts as a proxy to facilitate communications between EGMs 602 at the first site 830 and the primary host of the multiplayer game (e.g., the remote multiplayer game server 810). When proxy hosting, the proxy host (e.g., the multiplayer game server 610) passes game communication data back and forth with local EGMs 602 as if the multiplayer game server 610 was hosting the multiplayer game. The multiplayer game server 610 proxies the game messages to the remote multiplayer game server 810, receiving and retransmitting game messages between the EGMs 602 and the multiplayer game server 810 over an outbound connection (e.g., network 702 and the Internet 608 in this example). The remote multiplayer game server 810 similarly transmits game play data for the EGMs 602 back and forth via the multiplayer game server 610. As such, the remote multiplayer game server 810 receives and responds to all game events and requests.

In another embodiment, referred to herein as "duplication hosting," the multiplayer game server 610 duplicates game data of the multiplayer game from the multiplayer game database 812 (e.g., into the local multiplayer game database 612) and offers the multiplayer game locally to the EGMs 602. The multiplayer game server 610 receives any status changes in the multiplayer game through replication messages from the remote multiplayer game server 810. As such, since the multiplayer game server 610 maintains a current copy of the multiplayer game status, the multiplayer game server 610 responds to any data requests made by the EGMs 602 directly. When any state changing events are generated by the EGMs 602 (e.g., spot win message), the multiplayer game server 610 transmits a spot win message to the remote multiplayer game server 810, with the remote multiplayer game server 810 (e.g., as the primary host) arbitrating how the state change is processed (e.g., approving participation in the current multiplayer game cycle, or such).

In the example embodiment, the remote multiplayer game server 810 interacts with the remote multiplayer display controller 820 to display multiplayer game data on the remote multiplayer display 822. In addition, the multiplayer display 622 may also be allocated for use with the multiplayer game. In proxy hosting embodiments, the multiplayer display controller 620 may be controlled by messages passed through the multiplayer game server 610 (e.g., game play data). In duplication hosting embodiments, the multiplayer game server 610 may control the multiplayer display 622 and transmit game play data directly to the display 622. In direct control embodiments, the remote multiplayer game server 810 may have network connectivity with the multiplayer display controller 620 and, as such, may directly control the display 622. In some embodiments, the multiplayer game architecture provides a network of multiplayer displays 622, 822 that can be used for various multiplayer game play. Some sites 830, 840 may have multiple multiplayer displays 622, 822 which may concurrently support one or more multiplayer games, either locally or remotely hosted.

In some embodiments, multiplayer displays 622, 822 may be configured to automatically activate and display particular multiplayer game play data based on proximity to participating players. For example, a venue may have one large multiplayer display 622 configured at one position within the venue, as well as several other smaller multiplayer displays 622 dispersed throughout the venue. The multiplayer game server 610 may be configured to activate a multiplayer display 622 near a particular EGM 602 when that EGM 602 begins participating in multiplayer game play. The multiplayer game server 610 or the multiplayer display controller 620 may, for example, store a mapping of EGMs visible to that particular multiplayer display 622, and multiplayer game play on any of those EGMs may cause the multiplayer display 622 to display multiplayer game play data under triggering conditions (e.g., multiplayer game play on the EGM, upon a participation win on the EGM).

In some embodiments, in addition to the communal game(s) being hosted by the remote multiplayer game server 810 and proxied by the multiplayer game server 610, either or both of the multiplayer game servers 810 may additionally host communal games locally.

Figure 9:
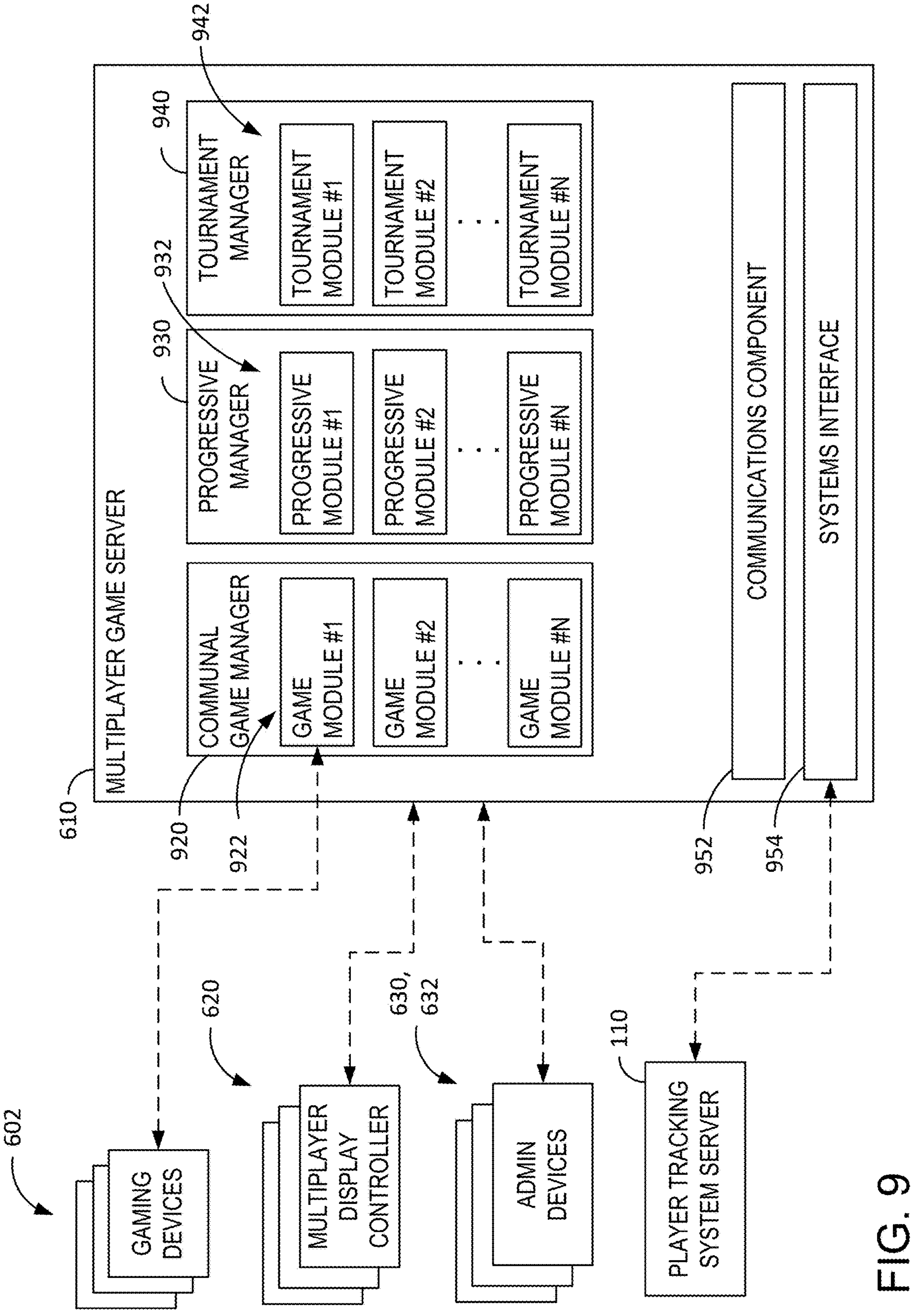
FIG. 9 is a component diagram illustrating the multiplayer game server and various supporting software components for providing the multiplayer games.

FIG. 9 is a component diagram illustrating the multiplayer game server 610 and various supporting software components for providing the multiplayer games. In the example embodiment, the multiplayer game server 610 includes, inter alia, a communications component 952 and a systems interface 954, as well as various multiplayer games, including communal games, progressives, and tournament games. The multiplayer game server 610 is configured to perform functionality such as establishing connections (e.g., with gaming devices 602, multiplayer display controllers 620, admin devices 630, 632, and other casino management systems or such), maintain heartbeats, register IDs, retrieve player tracking data, and so forth. The communications component 952 includes one or more communications interfaces (e.g., network interface cards) and facilitates network communication with EGMs 602, multiplayer display controllers 620, admin devices 630, 632, and player tracking system server 110, amongst other devices. The systems interface 954 provides connectivity with the player tracking system server 110 to facilitate interaction and data access for loyalty players.

In the example embodiment, the multiplayer game server 610 includes a communal game manager 920 configured to provide various communal games. The communal game manager 920 includes game components 922, where each game component 922 represents an installed multiplayer communal game (e.g., Ca$h Wall, multiplayer slot, or other communal games). The multiplayer game server 610 also includes a progressive manager 930 configured to administer various progressive jackpots. The progressive manager 930 includes progressive components 932, where each progressive component 932 represents a particular type of progressive jackpot. The multiplayer game server 610 further includes a tournament manager 940 that provides various types of tournament games. The tournament manager 940 includes tournament components 942, where each tournament component 942 represents a particular type of tournament game.

Each of the components 922, 932, 942 are installed into the multiplayer game server 610 to enable support for the particular type of multiplayer game. In some situations, the multiplayer game server 610 may only have one or a few multiplayer games installed (e.g., based on the needs of the venue or operator). During operation, one or more multiplayer game instances of each of the components 922, 932, 942 (e.g., multiple instantiations of the various multiplayer games) may be instantiated and executed by the multiplayer game server 610. Further, each component 922, 932, 942 may create multiple game instances, where each game instance provides a particular multiplayer game (e.g., a communal game such as Ca$h Wall). Since each gaming device 200 provides currency information and wager bet information to the multiplayer game server 610, each game (e.g., Ca$h Wall community game) can provide participation that utilizes different currency types (e.g., real currency, virtual currency, mixed currencies) corresponding to different primary game types being played on the various gaming devices 602, and can include remote gaming devices 802. For example, the multiplayer game server 610 may be configured to provide two distinct instances of Ca$h Wall, one within a lounge venue at a casino property and another at a private room venue. Each of the multiplayer game instances may be configured differently and may operate independent of the other multiplayer game instances. Multiplayer game instances may be instantiated during operation, such as, for example, based on a scheduled start time for an multiplayer game instance, upon administrative command (e.g., by venue personnel 642), or automatically in response to EGM activity (e.g., when a number of participating players exceeds a pre-determined threshold, when participation award rate exceeds a pre-determined rate). Multiplayer game instances may be closed during operation, such as, for example, after a final multiplayer game round, upon administrative command, after a schedule time is exceeded, automatically in response to EGM activity (e.g., when a number of participating players drops below a pre-determined threshold, when participation award rate drops below a pre-determined rate), or such. In some embodiments, multiple components 922, 932, 942 may be linked together such that game outcomes could affect other multiplayer games. For example, communal game component #1 922 may be linked to progressive component #1 932 such that the game outcome for the communal game affects the game outcome of another game running on progressive component #1 932.

In some embodiments, the operator 640 configures how many instances of each particular multiplayer game are going to run, and perhaps a scheduled timing of each particular multiplayer game. In some embodiments, the operator 640 or the venue personnel 642 may manually decide to instantiate one or more instances of particular multiplayer games (e.g., based on disposition or quantity of players at a venue). Each multiplayer game instance may be associated with one or more prize pools, as mentioned above. Some prize pools may support multiple multiplayer game instances.

In some embodiments, the gaming devices 602 may provide a UI window that displays information locally on the gaming device 602 but that is controlled remotely by the multiplayer game server 610. The UI window may be used, for example, to display a "mini-wall," a replica version of the Ca$h Wall that allows the player to view the state of the Ca$h Wall locally. The multiplayer game server 610 may send data to each gaming device 602 as the state of the Ca$h Wall changes (e.g., as slots are filled, as rounds of game play occur). In some embodiments, the tournament components 942 may be configured to display, or otherwise cause to be displayed, overlays, user interface components, ranks, and such, on the gaming devices 602, multiplayer displays 622, or admin devices 630, 632 (e.g., via the mini-wall view, rendering a view hosted by the multiplayer game server 610). The tournament components 942 may receive base award values and apply multipliers to those base award values, returning the total award values back to the gaming devices 602 for addition to the credit meter.

Figure 5G:
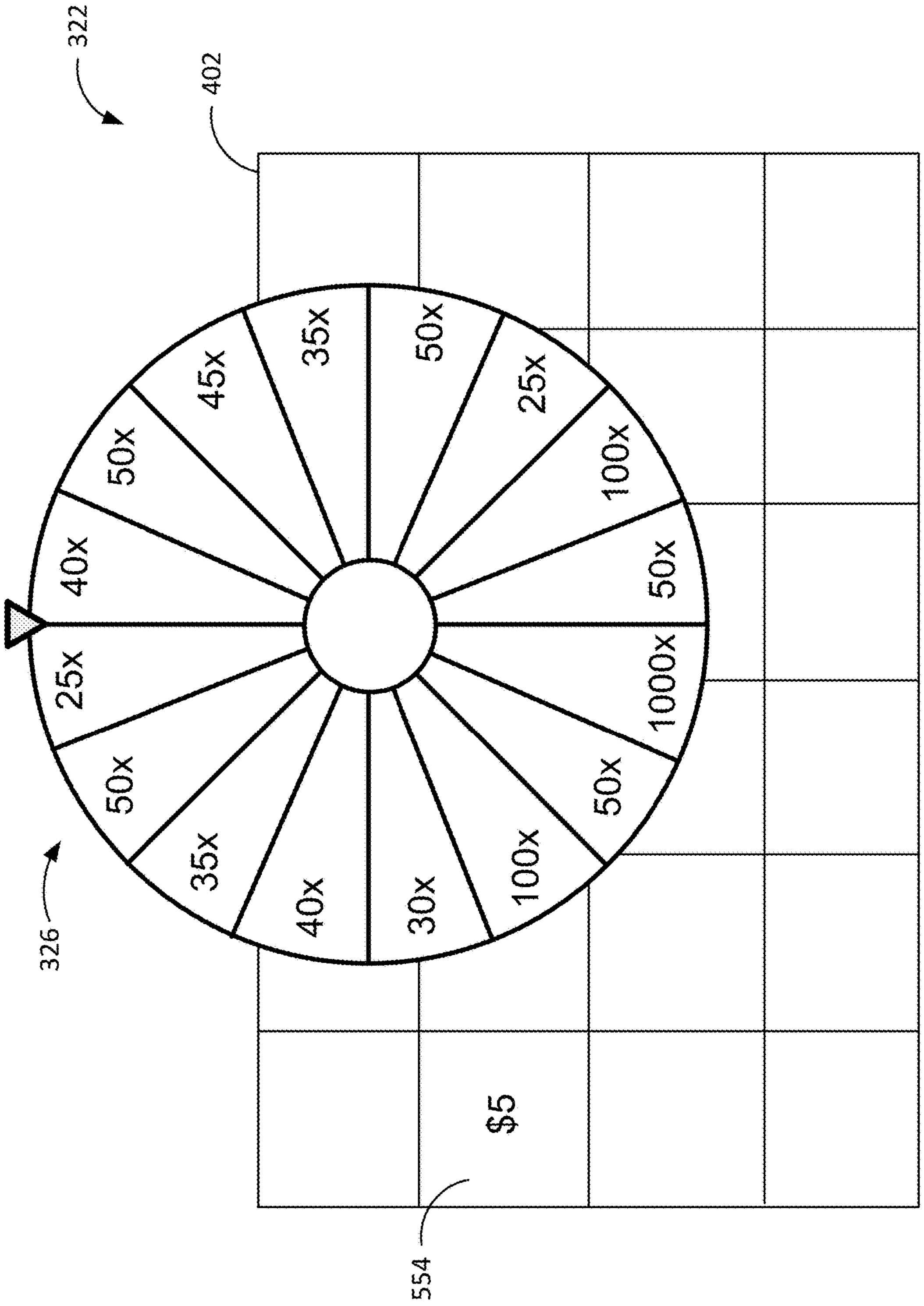
Figure 10:
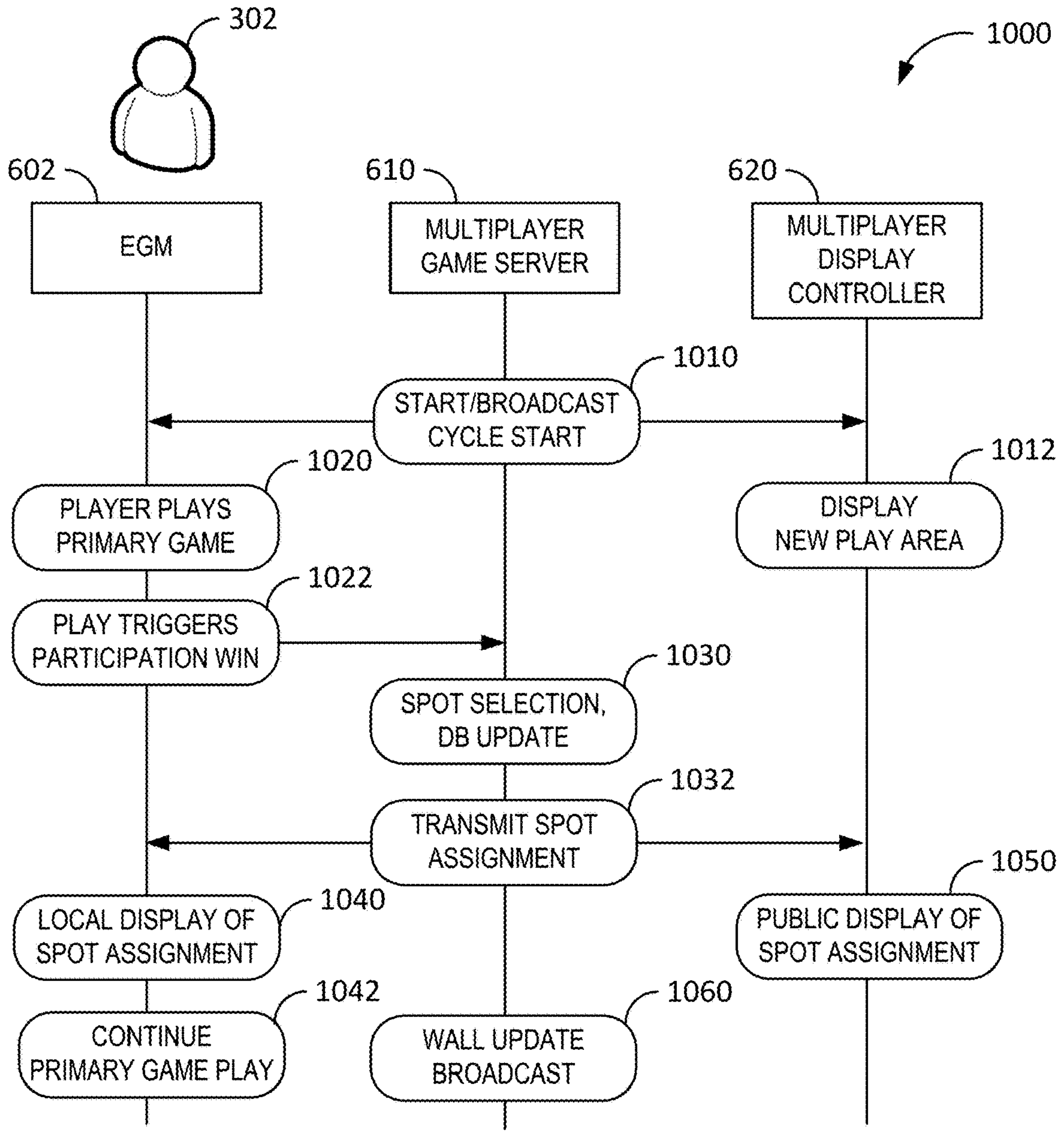
FIG. 10 is a swim lane diagram illustrating an example process flow for awarding participation in a communal game while the player plays a primary game on the EGM.

FIG. 10 is a sequence diagram illustrating an example process flow 1000 for awarding participation in a communal game while the player 302 plays a primary game on the EGM 602. In the example embodiment, the communal game is a Ca$h Wall game as illustrated in FIGS. 4-5G, and the process flow 1000 is performed between the EGM 602, the multiplayer game server 610, and the multiplayer display controller 620 of the example networked environment 600. In some embodiments, the process flow 1000 may be performed with computing devices 304 in networked environment 700 or with remote EGMs 802, remote multiplayer game server 810, or remote multiplayer display controller 820 of networked environment 800.

At operation 1010 of the example embodiment, the multiplayer game server 610 begins a current cycle of communal game play, resetting the play area 322 and broadcasting a cycle start message to participating EGMs 602 and multiplayer display controller(s) 620 indicating that a new cycle is starting. In some embodiments, the multiplayer game server 610 may initiate a cycle timer that may be used to track how long the cycle will accept participation awards. The multiplayer display controller 620 displays the new play area at operation 1012 and may additionally display the cycle timer. At operation 1020, the player 302 conducts primary game play on the EGM 602, which in this example is participating in the communal game. During primary game play, the player 302 triggers a participation win at operation 1022 (e.g., winning a spot on the Ca$h Wall during primary game play) and the EGM 602 transmits a participation trigger message to the multiplayer game server 610. At operation 1030, upon receiving the participation trigger message from the winning EGM 602, the multiplayer game server 610 awards participation in the communal game to the winning player 302, selecting a spot on the play area 322 (e.g., chosen randomly) for this spot win and updating the database 612 with the assigned spot. At operation 1032, the multiplayer game server 610 transmits a participation award message to the EGM 602 (e.g., to inform the player of their spot assignment) as well as a spot assignment message to the multiplayer display controller 620 (e.g., to update the Ca$h Wall with the new spot assignment).

At operation 1040 of the example embodiment, the EGM 602 performs a local display of the spot assignment and may update a local display of the play area 322 on the EGM 602. After viewing their spot win, the player 302 continues primary game play at operation 1042, and may win additional spots on the Ca$h Wall during this current cycle of communal game play. In addition, at operation 1050, the multiplayer display controller 620 performs a public display of the spot assignment in the play area 322 (e.g., shown on the multiplayer public display 622). Similarly, other spots may be awarded to various players 302 at other participating EGMs 602, causing spot selection, assignment, and update as shown here. At operation 1060, the multiplayer game server 610 may transmit a wall update broadcast message 1060 to participating EGMs 602 and multiplayer display controllers 620 (e.g., periodically, or upon state change), thereby updating local and public displays of the communal play area 322.

Figure 11:
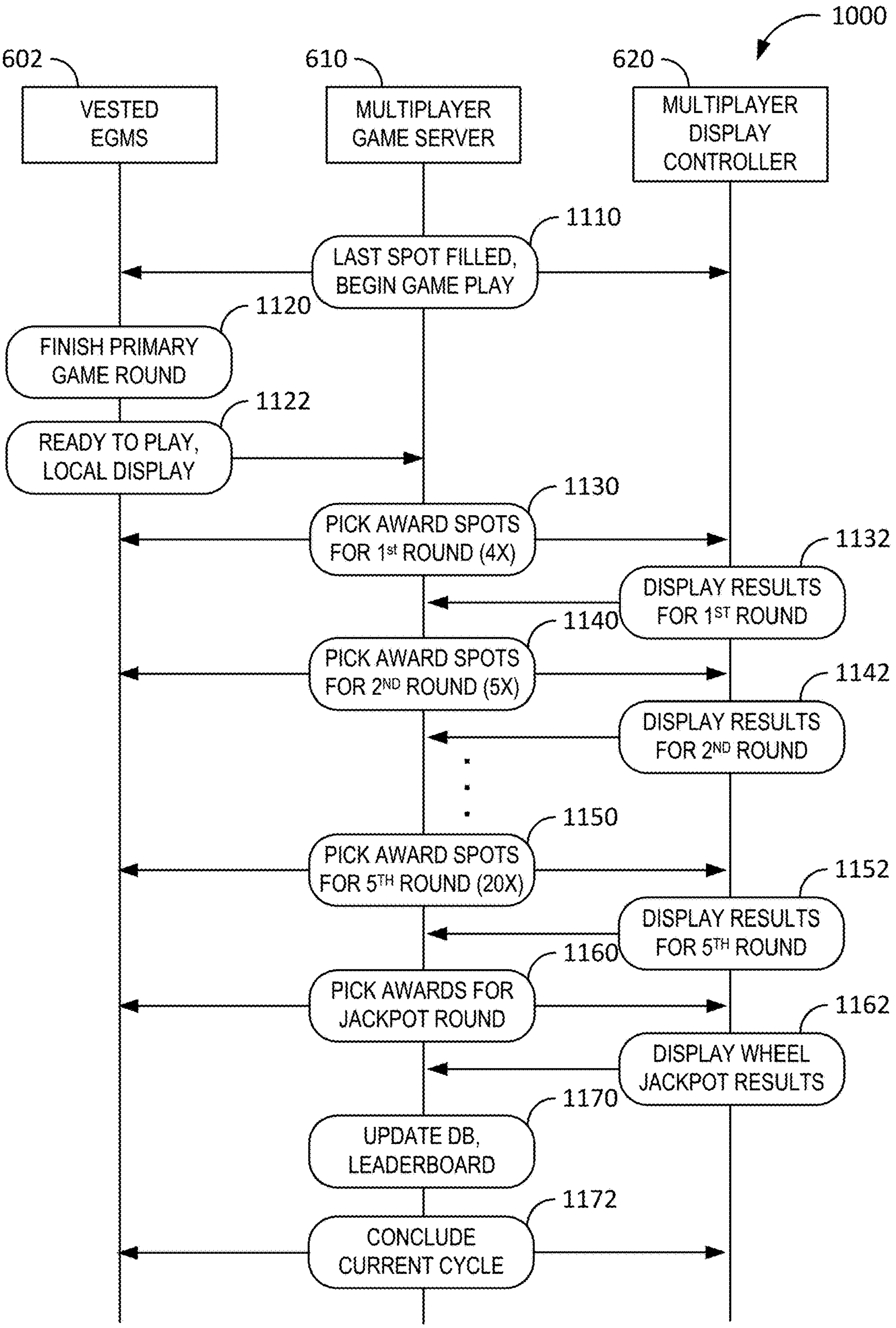
FIG. 11 is a swim lane diagram illustrating a continuation of the example process flow in which a game cycle of the example communal game is conducted.

FIG. 11 is a sequence diagram illustrating a continuation of the example process flow 1000 in which a cycle of play of the example communal game is conducted. At operation 1110 of the example embodiment, the final participation of the current communal game cycle has been awarded (e.g., last spot awarded, cycle timer expired) and the multiplayer game server 610 begins game play for the current communal game cycle. The multiplayer game server 610 transmits a game play alert message to each of the vested EGMs 602 (e.g., each EGM 602 having one or more spots on the current play area 322) and waits for each of the vested EGMs 602 to be prepared for game play. At operation 1120, the vested EGMs 602 finish their current primary game rounds and transmit game play ready messages to the multiplayer game server 610.

During communal game play, the multiplayer game server 610 conducts multiple rounds of play. For each round of play, the multiplayer game server 610 determines which communal game participants will receive which particular awards. The multiplayer game server 610 may also determine a choreography (e.g., of the play area 322) to display on the multiplayer display device 622 for each round of play (e.g., illustrating which spots win for that round). In the example embodiment, the multiplayer game server 610 transmits winners and award information to the multiplayer display controller 620 and the multiplayer display controller 620 generates and displays game choreography (e.g., highlighting of rows or columns until the winning rows or columns remain highlighted). In the example embodiment, the Ca$h Wall game, as described above, includes five rounds of play in which spots in one or more rows or columns are awarded multipliers and eliminated from play, as well as a jackpot round for spots remaining after the five rounds of play. More specifically, at operation 1130, multiplayer game server 610 picks award spots (e.g., spots in one or more rows or columns) for the first round to receive a 4× multiplier and transmits those results to multiplayer display controller 620 for display at operation 1132. The multiplayer game server 610 may also transmit award results to each of the vested EGM 602 that is awarded during the current round of play, indicating to the winning player 302 that they won and how much they were awarded during the current communal game round. The multiplayer game server 610 also transmits winning rows or columns, award results, and any individual wins to any or all of the vested EGMs 602 or all participating EGMs 602 for local display to the players 302.

As such, at operation 1140, the multiplayer game server 610 similarly picks award spots in the second round to receive a 5× multiplier and the multiplayer display controller displays results for the second round at operation 1142. The multiplayer game server 610 continues through each of the five rounds, concluding with picking award spots for the fifth round to receive a 20× multiplier at operation 1150 and displaying the results of the fifth round at operation 1152. If there are any remaining, unawarded spots after the fifth round of play, the multiplayer game controller 610 may provide a jackpot round in which one or more of the remaining spots are awarded based on a spin of the award wheel 326 (e.g., as shown in FIG. 5G) at operation 1160, displaying the wheel award results at operation 1162. Upon conclusion of the jackpot round, at operation 1170, the multiplayer game server 610 updates the database 610 with award amounts for each spot, updates a leader board that may track and rank winning players over multiple communal game cycles, and concludes the current communal game cycle at operation 1172. The multiplayer game server 610 may then begin the next communal game cycle as shown and described in FIG. 10.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program components, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. A communal gaming system for providing a communal game that includes multiple gaming devices, the communal gaming system comprising:

at least one processor; and a memory storing instructions that, when executed, cause the at least one processor to:

initiating entry into the communal game, entry into the communal game shared amongst the multiple gaming devices being awardable to eligible player accounts for the game cycle;

receive, from a first gaming device of the multiple gaming devices, a first communal participation trigger message indicating an occurrence of a first trigger condition associated with the first gaming device, the first communal participation trigger message includes a first wager bet identified in a real currency;

receive, from a second gaming device of the multiple gaming devices, a second communal participation trigger message indicating an occurrence of a second trigger condition associated with the second gaming device, the second communal participation trigger message includes a second wager bet identified in a virtual currency;

provide a first entry to a first player account associated with the first gaming device based on receiving the first communal participation trigger message;

provide a second entry to a second player account associated with the second gaming device based on receiving the second communal participation trigger message;

assign a first communal game spot in a shared play area to a first gaming device based on receiving the first communal participation trigger message, thereby causing the first communal game spot to be occupied and associated with the first gaming device, wherein the first communal game spot displays an icon indicating a first game type and the first wager bet;

assign a second communal game spot in the shared play area to a second gaming device based on receiving the second communal participation trigger message, thereby causing the second communal game spot to be occupied and associated with the second gaming device, wherein the second communal game spot displays an icon indicating a second game type and the second wager bet; and trigger a payout operation of the communal game that generates game awards for the first player account in the real currency and for the second player account in the virtual currency.

2. The communal gaming system of claim 1, wherein the first gaming device is a gaming device located at a gaming venue and allows gaming in the real currency, wherein the second gaming device is a mobile gaming device providing online game play in the virtual currency.

3. The communal gaming system of claim 1, wherein a game award currency is determined for each game award provided by the communal game based on a wager currency type of wager bets provided during play of a primary game on the multiple gaming devices.

4. The communal gaming system of claim 1, wherein the instructions further cause the at least one processor to determine that the second gaming device is not located at a gaming venue, thereby allowing the second gaming device to participate in the communal game only using the virtual currency.

5. The communal gaming system of claim 1, wherein the instructions further cause the at least one processor to:

determine that the second gaming device is located at a gaming venue based on one or more of (a) wireless connectivity between the second gaming device and a wireless beacon located at the gaming venue and (b) global positioning system (GPS) location of the second gaming device being one or more of (i) within a geofenced location of the gaming venue and (ii) within a predetermined distance of a GPS location associated with the gaming venue; and allow communal game participation by the second gaming device in the real currency based on the determination.

6. A communal gaming system for providing a communal game that includes multiple gaming devices, the communal gaming system comprising:

at least one processor; and a memory including instructions that, when executed, cause the at least one processor to:

initiate entry into the communal game, entry into the communal game shared amongst the multiple gaming devices being awardable to eligible player accounts for the game cycle;

receive, from a first gaming device of the multiple gaming devices, a first communal participation trigger message that includes a first game type and a first wager bet associated provided at the first gaming device;

receive, from a second gaming device of the multiple gaming devices, a second communal participation trigger message that includes a second game type and a second wager bet provided at the second gaming device, the second game type being different than the first game type;

assign a first communal game spot in a shared play area to a first gaming device based on receiving the first communal participation trigger message, thereby causing the first communal game spot to be occupied and associated with the first gaming device, wherein the first communal game spot displays an icon indicating the first game type and the first wager bet;

assign a second communal game spot in the shared play area to a second gaming device based on receiving the second communal participation trigger message, thereby causing the second communal game spot to be occupied and associated with the second gaming device, wherein the second communal game spot displays an icon indicating the second game type and the second wager bet; and generate game outcomes for the first gaming device and the second gaming device for the game cycle based on the first and the second communal game spots and the first and the second wager bets.

7. The communal gaming system of claim 6, wherein the first wager bet is provided in a first currency type, wherein the second wager bet is provided in a second currency type.

8. The communal gaming system of claim 7, wherein the first gaming device is a gaming device located within a gaming area designated for gaming in a real currency, wherein the second gaming device is a mobile device providing online game play in the virtual currency.

9. The communal gaming system of claim 7, wherein the communal gaming system supports participation by mobile gaming devices in both the real currency and the virtual currency.

10. The communal gaming system of claim 7, wherein the first gaming device is a mobile gaming device, wherein the instructions further cause the at least one processor to determine that the first gaming device is at a gaming venue that allows wagering in the real currency based on one or more of geofencing and wireless connectivity between the first gaming device and a wireless network at the gaming venue.

11. The communal gaming system of claim 6, wherein generating game outcomes includes determining a game award currency for each game award provided by the communal game based on a wager currency type of wager bets provided during play of a primary game on the first and second gaming devices.

12. The communal gaming system of claim 6, wherein the first gaming device is an electronic gaming device (EGM) installed at a gaming venue and providing a first game type operating in a real currency, wherein the second gaming device is a mobile device providing a second game type operating in a virtual currency.

13. A communal gaming system for providing a communal game that includes multiple gaming devices, the communal gaming system comprising:

at least one processor; and a memory including instructions that, when executed, cause the at least one processor to:

begin a game instance of the communal game, the communal game is provided to the multiple gaming devices, each game spot of the matrix of communal game spots being awardable during the game cycle based on predetermined trigger conditions;

receive, from a first mobile gaming device located at a gaming venue, a first communal participation trigger message that includes a first wager bet identified in a first currency type;

receive, from a second mobile gaming device remote to the gaming venue, a second communal participation trigger message that includes a second wager bet identified in a second currency type that is different than the first currency type;

assign a first communal game spot in a shared play area to a first player account associated with the first mobile gaming device based on receiving the first communal participation trigger message, thereby causing the first communal game spot to be occupied and associated with the first player account, wherein the first communal game spot displays an icon indicating a first game type and the first wager bet;

assign a second communal game spot in the shared play area to a second player account associated with the second mobile gaming device based on receiving the second communal participation trigger message, thereby causing the second communal game spot to be occupied and associated with the second player account, wherein the second communal game spot displays an icon indicating a second game type and the second wager bet; and determine game awards for the first player account in the first currency type and for the second player account in the second currency type.

14. The communal gaming system of claim 13, wherein the instructions further cause the at least one processor to determine that the first mobile gaming device is located at the gaming venue using geofencing, wherein the first currency type is a real currency.

15. The communal gaming system of claim 13, wherein the instructions further cause the at least one processor to provide participation in the communal game in a real currency to one or more mobile gaming devices based on geolocation of the one or more mobile gaming devices relative to at least one gaming venue.

16. The communal gaming system of claim 13, wherein a game award currency is determined for each game award provided by the communal game based on a wager currency type of wager bets provided during play of a primary game on the multiple gaming devices.

17. The communal gaming system of claim 13, wherein the instructions further cause the at least one processor to determine that the first mobile gaming device is located at the gaming venue based on network connectivity between the first mobile gaming device and a wireless network device located at the gaming venue.

18. The communal gaming system of claim 13, wherein the instructions further cause the at least one processor to refuse participation in the communal game to one or more mobile gaming devices after determining that those one or more mobile gaming devices are no longer located at the gaming venue.

* * * * *